US011963096B2

(12) United States Patent
Sugaya

(10) Patent No.: US 11,963,096 B2
(45) Date of Patent: Apr. 16, 2024

(54) COMMUNICATION APPARATUS AND COMMUNICATION SYSTEM

(71) Applicant: SONY GROUP CORPORATION, Tokyo (JP)

(72) Inventor: Shigeru Sugaya, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/835,437

(22) Filed: Jun. 8, 2022

(65) Prior Publication Data

US 2022/0303891 A1 Sep. 22, 2022

Related U.S. Application Data

(63) Continuation of application No. 17/044,391, filed as application No. PCT/JP2019/012724 on Mar. 26, 2019, now Pat. No. 11,399,341.

(30) Foreign Application Priority Data

Apr. 9, 2018 (JP) ................. 2018-074703

(51) Int. Cl.
*H04W 48/20* (2009.01)
*H04W 8/24* (2009.01)
(Continued)

(52) U.S. Cl.
CPC ............ *H04W 48/20* (2013.01); *H04W 8/24* (2013.01); *H04W 48/06* (2013.01); *H04W 48/16* (2013.01); *H04W 88/16* (2013.01); *H04W 84/12* (2013.01)

(58) Field of Classification Search
CPC .............................. H04W 16/24; H04W 24/02
(Continued)

(56) References Cited

U.S. PATENT DOCUMENTS

2006/0092880 A1* 5/2006 Nounin ................. H04B 1/406
455/422.1
2009/0059849 A1* 3/2009 Namba ............... H04L 61/5038
370/328
(Continued)

FOREIGN PATENT DOCUMENTS

CN 101754271 A 6/2010
CN 102577581 A 7/2012
(Continued)

OTHER PUBLICATIONS

International Search Report and Written Opinion of PCT Application No. PCT/JP2019/012724, dated Jun. 11, 2019, 08 pages of English Translation and 08 pages of ISRWO.
(Continued)

*Primary Examiner* — Kiet M Doan
(74) *Attorney, Agent, or Firm* — CHIP LAW GROUP

(57) ABSTRACT

The present technique relates to a communication apparatus and a communication system allowing distribution of loads on a communication apparatus that manages Internet connection. A communication system according to an aspect of the present technique includes: a first communication apparatus included in a wireless LAN including a plurality of communication apparatuses functioning as gateways, the first communication apparatus including a communication control section configured to transmit, when the first communication apparatus is connected to an external network, a management frame including a parameter related to a capability of connecting to the external network, to another apparatus within the wireless LAN; and a second communication apparatus operating as the first communication apparatus and including a communication control section configured to receive the management frame transmitted from the first communication apparatus and transmit, to the first communication apparatus, connection request informa-
(Continued)

tion representing a request for connection to the external network. The present technique can be applied to a communication apparatus for a wireless LAN.

6 Claims, 30 Drawing Sheets

(51) Int. Cl.
*H04W 48/06* (2009.01)
*H04W 48/16* (2009.01)
*H04W 88/16* (2009.01)
*H04W 84/12* (2009.01)

(58) Field of Classification Search
USPC ............ 370/356, 364, 445; 455/422.1
See application file for complete search history.

(56) References Cited

U.S. PATENT DOCUMENTS

| | | | |
|---|---|---|---|
| 2011/0013616 A1* | 1/2011 | Fischer | H04L 1/0618 370/344 |
| 2011/0090886 A1 | 4/2011 | Park | |
| 2011/0235561 A1 | 9/2011 | Liu | |
| 2013/0279345 A1 | 10/2013 | Tamura | |
| 2016/0029384 A1* | 1/2016 | Sidhu | H04W 72/0453 370/329 |
| 2016/0165654 A1 | 6/2016 | Sato et al. | |
| 2017/0208079 A1* | 7/2017 | Cammarota | H04L 63/1425 |
| 2017/0280460 A1* | 9/2017 | Emmanuel | H04L 5/0055 |
| 2017/0347312 A1 | 11/2017 | Kang et al. | |
| 2018/0184367 A1* | 6/2018 | Yeon | H04W 48/18 |

FOREIGN PATENT DOCUMENTS

| | | |
|---|---|---|
| CN | 103825901 A | 5/2014 |
| CN | 105637937 A | 6/2016 |
| EP | 3024277 A1 | 5/2016 |
| JP | 2004229225 A | 8/2004 |
| JP | 2010-157838 A | 7/2010 |
| JP | 2012095339 A | 5/2012 |
| JP | 2013-214824 A | 10/2013 |
| JP | 2015-023371 A | 2/2015 |
| JP | 2015-186162 A | 10/2015 |
| KR | 20030071981 A | 9/2003 |
| WO | WO-2007022700 A1 | 3/2007 |
| WO | 2012/101779 A1 | 8/2012 |
| WO | 2015/008712 A1 | 1/2015 |

OTHER PUBLICATIONS

International Preliminary Report on Patentability of PCT Application No. PCT/JP2019/012724, dated Oct. 22, 2020, 08 pages of English Translation and 05 pages of IPRP.
Notice of Allowance for U.S. Appl. No. 17/044,391, dated Mar. 9, 2022, 07 pages.
Non-Final Office Action for U.S. Appl. No. 17/044,391, dated Nov. 17, 2021, 14 pages.

* cited by examiner

F I G. 6

| IE Type | Length | ESS ID | Own MAC Address | Controller Available | Gateway Available | Intelligence Available |

Role Available Information Element

FIG. 7

| Role Separate Information Element | | | | | | |
|---|---|---|---|---|---|---|
| IE Type | Length | SSID | ESS ID | Controller Address | Gateway Address1 | Gateway Address2 | Intelligence Address |

FIG. 13

| Frame Control | Duration | Broadcast Address | Gateway Address | BSS ID | Sequence Control | ESS ID | Gateway Parameter | Gateway Attribute | Gateway Control | FCS |

Gateway Announcement Frame

FIG. 14

| Gateway Connection Request Frame | | | | | | |
|---|---|---|---|---|---|---|
| Frame Control | Duration | Gateway Address | Transmit Address | BSS ID | Sequence Control | Another GW Address | FCS |

FIG. 15

| Frame Control | Duration | Target Address | Gateway Address | BSS ID | Sequence Control | Another GW Address | FCS |
|---|---|---|---|---|---|---|---|
| | | | Gateway Connection Grant Frame | | | | |

FIG. 16

| Frame Control | Duration | Old Gateway Address | Transmit Address | BSS ID | Sequence Control | New Gateway Address | FCS |
|---|---|---|---|---|---|---|---|

Gateway Disconnection Request Frame

FIG. 17

| Frame Control | Duration | Target Address | Old Gateway Address | BSS ID | Sequence Control | New Gateway Address | FCS |
|---|---|---|---|---|---|---|---|

Gateway Disconnection Grant Frame

F I G. 2 4

| Usage Channels | Resource Unit Bandwidth | Protocol Version | TTL Value | Hop Value | Average Speed | Connect Counts | Usage MCS | Usage TX Power | Available Capacity |
|---|---|---|---|---|---|---|---|---|---|
| | | | | Gateway Parameter | | | | | |

F I G. 2 5

| Gateway Attribute | | | | | | | | |
|---|---|---|---|---|---|---|---|---|
| Frequency Bands | Channel Bandwidth | W-LAN Type | Country Code | Support Protocol | Connect Cost | Device Counts | Support MCS | Max TX Power | Max Capacity |

FIG. 26

| Gateway Control | | | | | | |
|---|---|---|---|---|---|---|
| Gateway IP Address | Local Address | User Select Information | Priority Gateway | Connection Domain | Connection Policy | Vendor Info | Support Parameter |

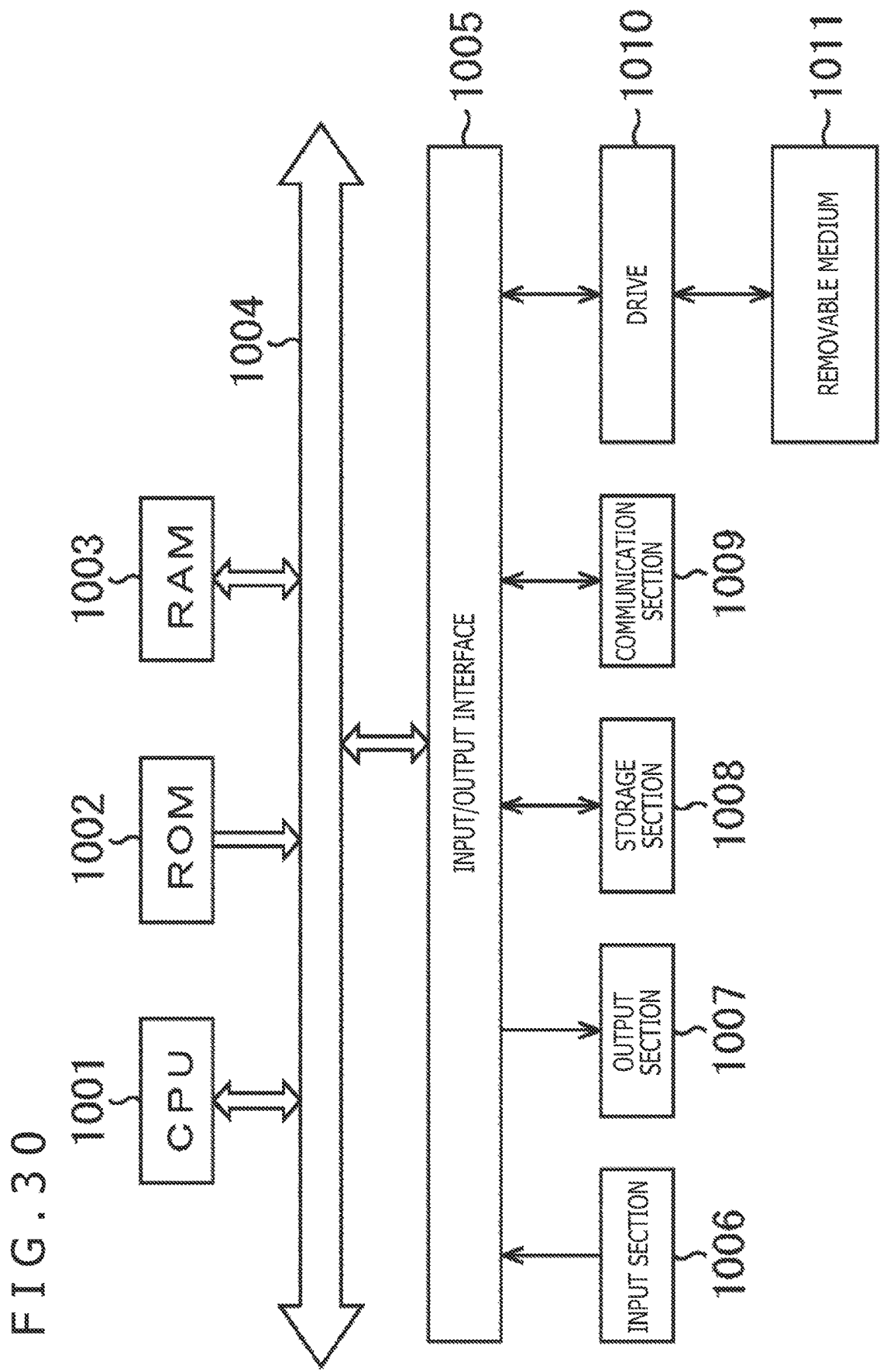

COMMUNICATION APPARATUS AND COMMUNICATION SYSTEM

CROSS REFERENCE TO RELATED APPLICATIONS

This application is a continuation application of U.S. patent application Ser. No. 17/044,391, filed on Oct. 1, 2020, is a U.S. National Phase of International Patent Application No. PCT/JP2019/012724 filed on Mar. 26, 2019, which claims priority benefit of Japanese Patent Application No. JP 2018-074703 filed in the Japan Patent Office on Apr. 9, 2018. Each of the above-referenced applications is hereby incorporated herein by reference in its entirety.

TECHNICAL FIELD

The present technique relates to a communication apparatus and a communication system, and in particular to a communication apparatus and a communication system enabled to distribute loads on a communication apparatus that manages Internet connection.

BACKGROUND ART

A BSS (Basic Service Set) corresponding to a wireless LAN network includes one access point and clients located within a reachable range of radio waves from the access point.

PTL 1 discloses a technique for a network including an access point and a plurality of mobile routers, the technique involving automatically constructing a mesh network on the basis of information related to a path from the access point to the Internet. Even in a case where a mobile router is located in an area where radio waves from the access point fail to reach the mobile router, the mobile router can access the access point via another mobile router to make Internet connection without using a mobile network.

CITATION LIST

Patent Literature

[PTL 1]
Japanese Patent Laid-Open No. 2015-186162

SUMMARY

Technical Problems

In the network as described above, all communication within the network concentrates on the single access point, and thus heavy loads are imposed on the access point. Additionally, in a case where any defect occurs at the access point, communication apparatuses within the network are precluded from connecting to the Internet.

In recent years, there has been an increase in the number of communication apparatuses that can operate as access points such as smartphones equipped with a function referred to as tethering.

Even though a plurality of communication apparatuses that can operate as access points is present within the same wireless LAN network, only one communication apparatus operates as an access point. This represents ineffective use of the functions of the communication apparatuses in the whole system.

In light of these circumstances, an object of the present technique is to allow distribution of loads on a communication apparatus that manages Internet connection.

Solution to Problems

A communication apparatus according to a first aspect of the present technique is included in a wireless LAN including a plurality of communication apparatuses functioning as gateways and includes a communication control section configured to transmit, when the subject communication apparatus is connected to an external network, a management frame including a parameter related to a capability of connecting to the external network, to another apparatus within the wireless LAN.

A communication apparatus according to a second aspect of the present technique includes a communication control section configured to receive a management frame transmitted from a predetermined apparatus connected to an external network and included in a plurality of predetermined apparatuses functioning as gateways for a wireless LAN, the management frame including a parameter related to a capability of connecting to the external network, the communication control section transmitting, to any one of the predetermined apparatuses, connection request information representing a request for connection to the external network.

In the first aspect of the present technique, in the wireless LAN including the plurality of communication apparatuses functioning as the gateways, when the subject communication apparatus is connected to the external network, the management frame including the parameter related to the capability of connecting to the external network is transmitted to another apparatus within the wireless LAN.

In the second aspect of the present technique, the management frame transmitted from the predetermined apparatus connected to the external network and included in the plurality of predetermined apparatuses functioning as the gateways for the wireless LAN is received, the management frame including the parameter related to the capability of connecting to the external network, and the connection request information representing the request for connection to the external network is transmitted to any one of the predetermined apparatuses.

Advantageous Effect of Invention

According to the present technique, loads on a communication apparatus that manages Internet connection can be distributed.

Note that the effect described here is not necessarily restrictive and that any of the effects described in the present disclosure may be produced.

BRIEF DESCRIPTION OF DRAWINGS

FIG. 6 is a diagram illustrating a configuration example of a Role Available Information Element.

FIG. 7 is a diagram illustrating a configuration example of a Role Separate Information Element.

FIG. 13 is a diagram illustrating a configuration example of a Gateway Announcement frame.

FIG. 14 is a diagram illustrating a configuration example of a Gateway Connection Request frame.

FIG. 15 is a diagram illustrating a configuration example of a Gateway Connection Grant frame.

FIG. 16 is a diagram illustrating a configuration example of a Gateway Disconnection Request frame.

FIG. 17 is a diagram illustrating a configuration example of a Gateway Disconnection Grant frame.

FIG. 24 is a diagram illustrating examples of parameters included in Gateway Parameter.

FIG. 25 is a diagram illustrating examples of parameters included in Gateway Attribute.

FIG. 26 is a diagram illustrating examples of parameters included in Gateway Control.

FIG. 30 is a block diagram illustrating a configuration example of a computer.

DESCRIPTION OF EMBODIMENT

An embodiment of the present technique will be described below. The description will be provided in the following order.
1 Configuration Example of Wireless LAN Network with Functions of Access Point Distributed
2. Example of Operations for Constructing Network with Functions of AP Distributed
3. Example of Selection of IG
4. Example of Data Transmission Using Spatial Multiplexing Communication
5. Example of Frame Format
6. Configuration Example of Communication Apparatus
7. Operations of Communication Apparatuses
8. Examples of Parameters
9. Example of Communication Relayed through AC
10. Modified Examples <Configuration Example of Wireless LAN Network with Functions of Access Point Distributed>

Figure 1:
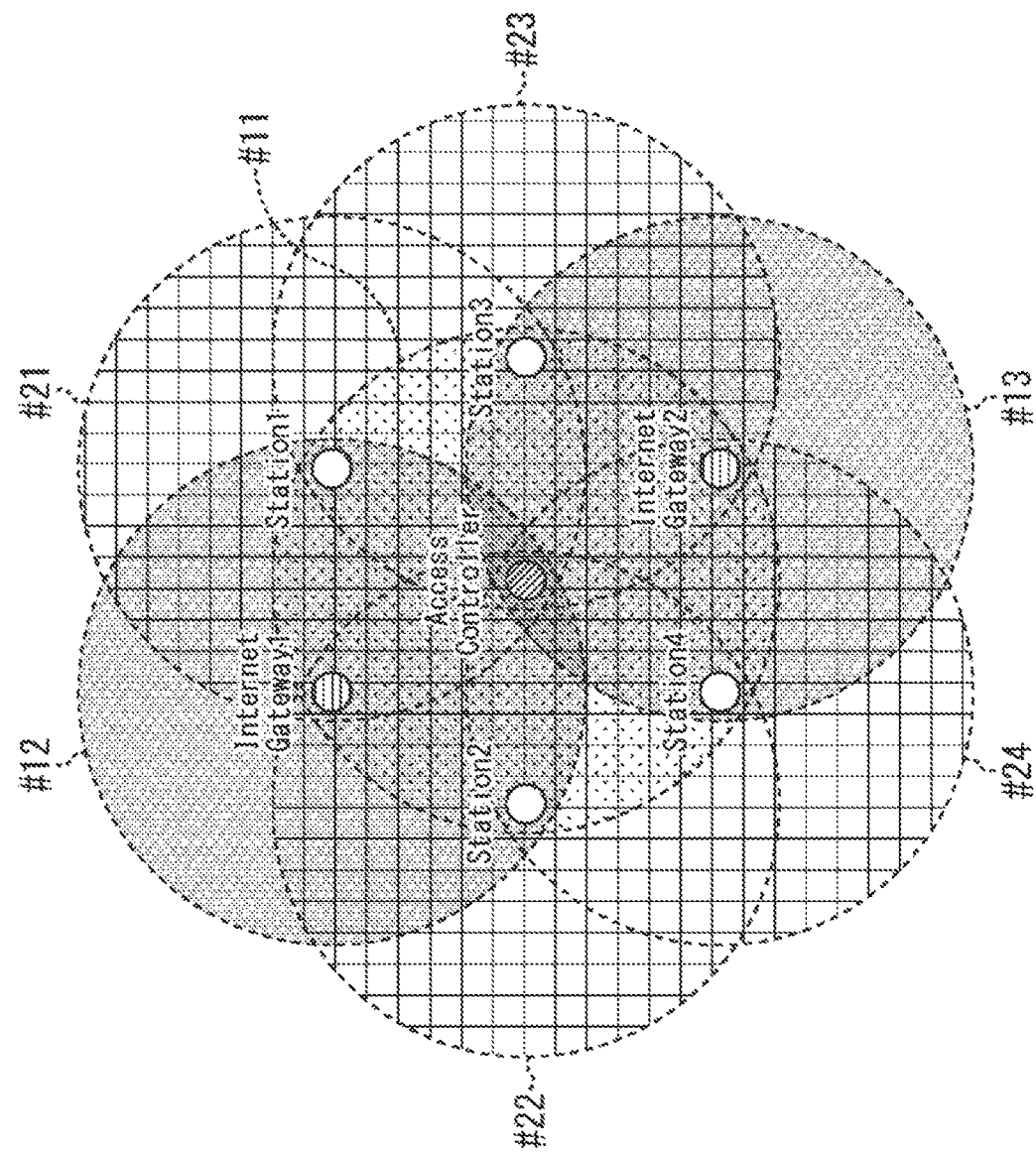
FIG. 1 is a diagram illustrating a configuration example of a network in which functions of an AP are distributed.

FIG. 1 is a diagram illustrating a configuration example of a network with functions of an access point (AP) distributed according to an embodiment of the present technique.

Seven small circles illustrated in FIG. 1 each represent a communication apparatus that has a communication function for a wireless LAN complying with predetermined standards of, for example, IEEE802.11. Dashed circles represent reachable ranges of radio waves from the respective communication apparatuses.

In the example in FIG. 1, a communication apparatus present near the center of the network operates as an Access Controller. Additionally, an upper left communication apparatus that can connect to an external network such as the Internet operates as an Internet Gateway 1, and a lower right communication apparatus that can connect to the external network operates as an Internet Gateway 2.

In other words, in the network in FIG. 1, the communication apparatus operating as an Access Controller takes responsibility for functions for access control in the network that are included in the functions of known APs and that include transmission of management frames. The management frames transmitted by the Access Controller include a Beacon frame, an Action frame, a Management frame, and a Trigger frame.

The Beacon frame transmitted by the Access Controller includes information such as addresses of the respective communication apparatuses included in the network. Signals transmitted by the Access Controller control access of each communication apparatus to the Access Controller or the Internet Gateway and identify the range of the BSS.

In the example in FIG. 1, the reachable range of radio waves from the Access Controller, indicated by a circle #11, includes the Internet Gateways 1 and 2 and Stations 1 to 4. The Stations 1 to 4, which are present within the reachable range of radio waves from the Access Controller, operate as client communication apparatuses belonging to the network managed by the Access Controller.

Additionally, the communication apparatuses operating as Internet Gateways take responsibility for gateway functions for the external network that are included in the functions of known APs. The Internet Gateways 1 and 2, for example, communicate with a server managed by a service provider providing connection services for the Internet and control transmission and reception of uplink data and downlink data.

The uplink data is, for example, data from the Stations to external apparatuses on the Internet. The downlink data is data from the external apparatuses on the Internet to the Stations.

In the example in FIG. 1, the reachable range of radio waves from the Internet Gateway 1, indicated by a circle #12, includes the Stations 1 and 2 in addition to the Access Controller. Additionally, the reachable range of radio waves from the Internet Gateway 2, indicated by a circle #13, includes the Stations 3 and 4 in addition to the Access Controller. Circles #21 to #24 represent the reachable ranges of radio waves from the Stations 1 to 4, respectively.

The Internet Gateway 1 manages Internet connection of the Station 1 and the Station 2 which are present within the reachable range of radio waves from the Internet Gateway 1.

Communication of the Stations 1 and 2 with external apparatuses on the Internet is performed via the Internet Gateway 1.

Similarly, the Internet Gateway 2 manages Internet connection of the Station 3 and the Station 4 which are present within the reachable range of radio waves from the Internet Gateway 2. Communication of the Stations 3 and 4 with external apparatuses on the Internet is performed via the Internet Gateway 2.

As described above, in the network in FIG. 1, the communication apparatuses different from the communication apparatus operating as an Access Controller operate as Internet Gateways to enable the Stations belonging to the network to make Internet connection.

By sharing the functions of an AP among a plurality of communication apparatuses, the network can be efficiently managed. The functions of the AP at least include the function for access control in the network including transmission of the Beacon frame and the gateway function for the external network.

Additionally, since the two communication apparatuses operate as Internet Gateways, communication within the network can be distributed. Three or more communication apparatuses may operate as Internet Gateways.

It is sufficient that radio waves reach the ranges around the Access Controller, and thus each communication apparatus can reduce transmission power for radio waves.

For example, even with the reduced transmission power of radio waves, the Access Controller can transmit signals such as for the Beacon frame into the range including all the communication apparatuses and indicated by the circle #11. In other words, a wireless LAN network can be constructed within a narrow range around the Access Controller. The reachable ranges of radio waves output by the respective communication apparatuses included in the network in FIG. 1 are each a narrow range including the positions of adjacent communication apparatuses.

Figure 2:
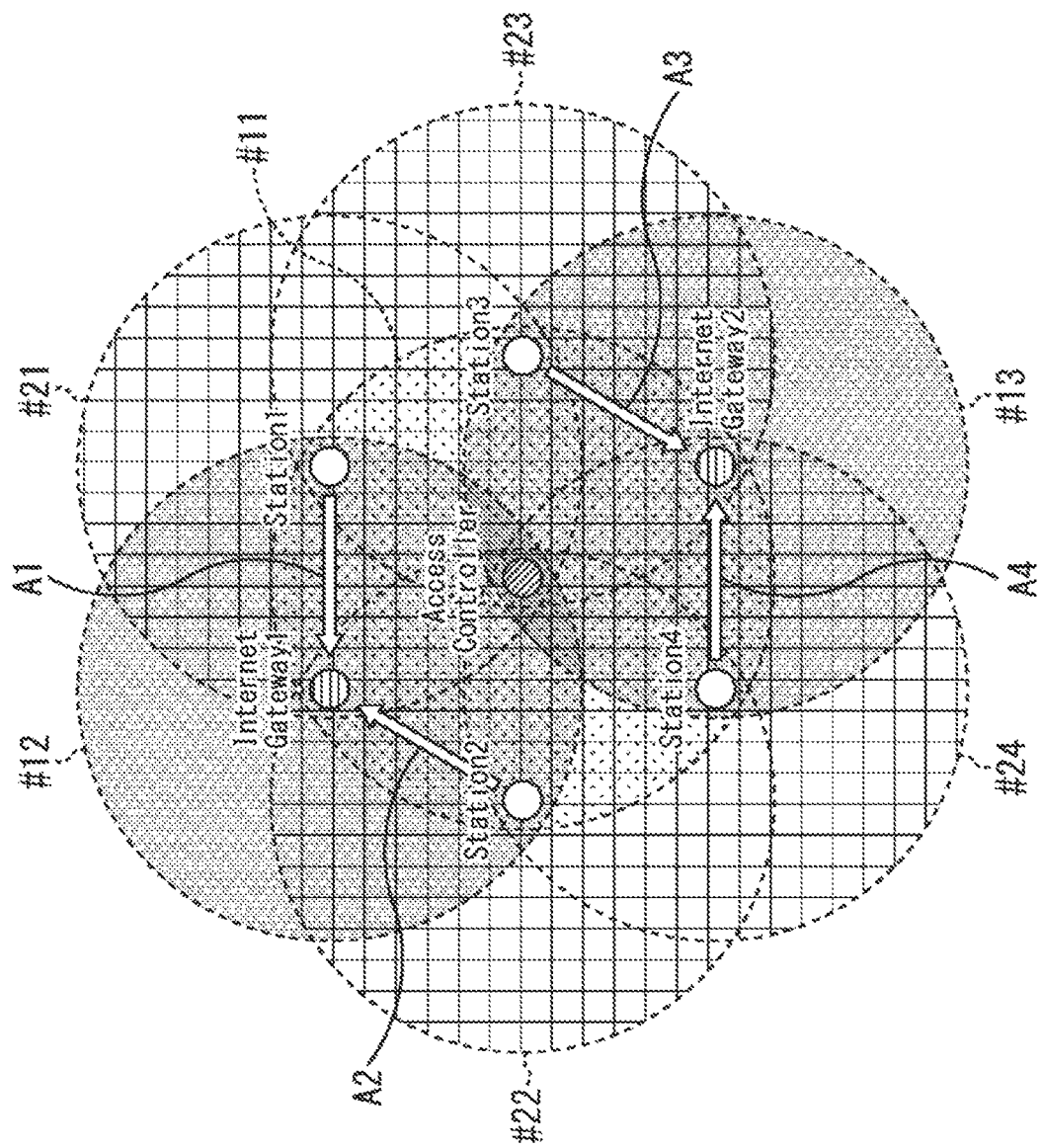
FIG. 2 is a diagram illustrating an example of a flow of uplink data.

FIG. 2 is a diagram illustrating an example of a flow of uplink data. Uplink data transmitted to an external apparatus by the Station 1 is received by the Internet Gateway 1 as indicated by blank arrow A1, and the Internet Gateway 1 transmits the data to an external apparatus corresponding to the destination. Uplink data transmitted to an external apparatus by the Station 2 is received by the Internet Gateway 1 as indicated by blank arrow A2, and the Internet Gateway 1 transmits the data to an external apparatus corresponding to the destination.

Similarly, uplink data transmitted to an external apparatus by the Station 3 is received by the Internet Gateway 2 as indicated by blank arrow A3, and the Internet Gateway 2 transmits the data to an external apparatus corresponding to the destination. Uplink data transmitted to an external apparatus by the Station 4 is received by the Internet Gateway 2 as indicated by blank arrow A4, and the Internet Gateway 2 transmits the data to an external apparatus corresponding to the destination.

Figure 3:
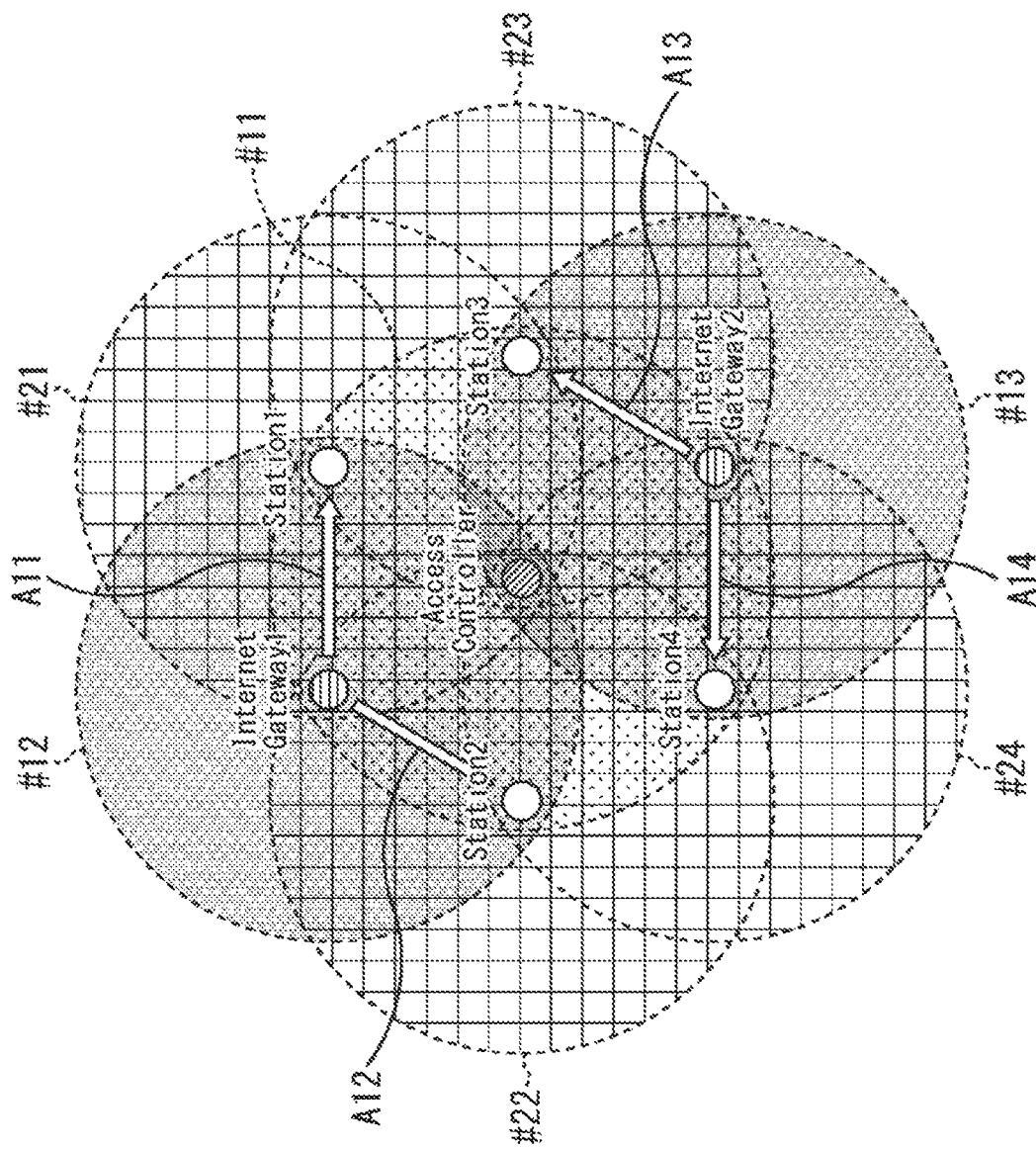
FIG. 3 is a diagram illustrating an example of a flow of downlink data.

FIG. 3 is a diagram illustrating an example of a flow of downlink data. Downlink data for the Station 1 transmitted from an external apparatus and received by the Internet Gateway 1 is transmitted from the Internet Gateway 1 to the Station 1 as indicated by blank arrow A11. Downlink data for the Station 2 transmitted from an external apparatus and received by the Internet Gateway 1 is transmitted from the Internet Gateway 1 to the Station 2 as indicated by blank arrow A12.

Similarly, downlink data for the Station 3 transmitted from an external apparatus and received by the Internet Gateway 2 is transmitted from the Internet Gateway 2 to the Station 3 as indicated by blank arrow A13. Downlink data for the Station 4 transmitted from an external apparatus and received by the Internet Gateway 2 is transmitted from the Internet Gateway 2 to the Station 4 as indicated by blank arrow A14.

As described above, in the network in FIG. 1, Internet connections made by the respective Stations are shared by the Internet Gateway 1 and the Internet Gateway 2.

The Access Controller is hereinafter referred to as AC and the Internet Gateway is hereinafter referred to as IG, as appropriate.

Additionally, the Stations are each referred to as a Near Station or a Far station on the basis of the position of the Station with reference to the Internet Gateway.

With the Internet Gateway 1 used as a reference, the Station 1 and the Station 2, which can communicate with the Internet Gateway 1, are Near Stations. The Station 3 and the Station 4, which fail to communicate with the Internet Gateway 1 but are present within the reachable range of radio waves from the AC, are Far Stations.

Additionally, with the Internet Gateway 2 used as a reference, the Station 3 and the Station 4, which can communicate with the Internet Gateway 2, are Near Stations. The Station 1 and the Station 2, which fail to communicate with the Internet Gateway 2 but are present within the reachable range of radio waves from the AC, are Far Stations.

Whether the Station operates as a Near Station or a Far Station is determined on the basis of a positional relation with the IG. As described below, even if any Far Station is prevented from utilizing the nearest Internet Gateway, the Far Station can connect to another Internet Gateway via the AC.

<Example of Operations for Constructing Network with Functions of AP Distributed>

Now, operations of the network will be described which are intended to share the functions of the AP among the plurality of communication apparatuses as described above.

Figure 4:
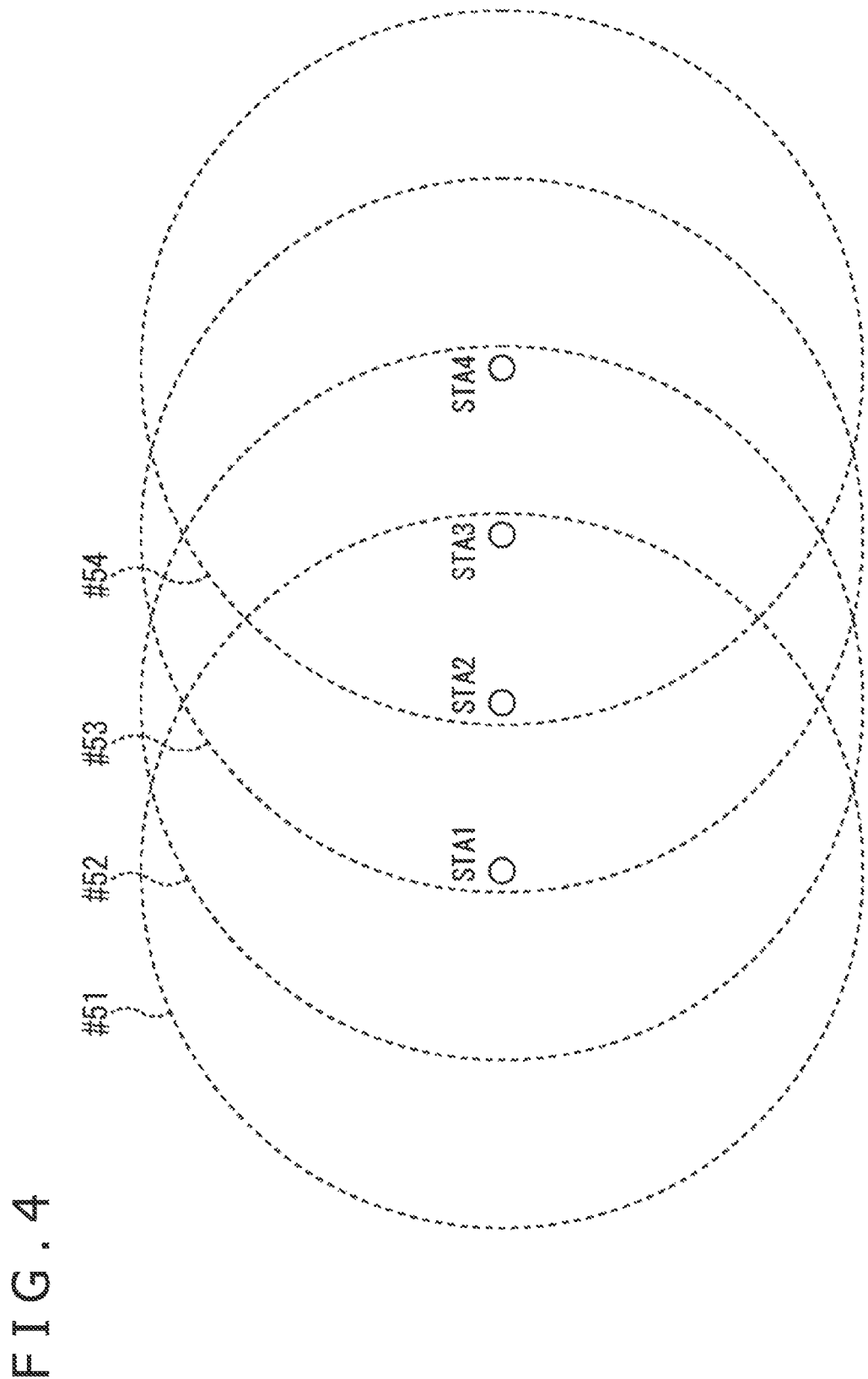
FIG. 4 is a diagram illustrating an example of a positional relation among communication apparatuses.

FIG. 4 is a diagram illustrating an example of the positional relation among the communication apparatuses.

As illustrated in FIG. 4, in the description, STAs 1 to 4 representing the Stations are assumed to be in a positional relation in which the Stations are arranged in order from the left. Circles #51 to #54 represent the reachable ranges of radio waves from the STAs 1 to 4, respectively.

In this example, each STA can communicate with the STA two STAs ahead but fails to communicate with the STA further ahead. Specifically, the STA 1 fails to communicate directly with the STA 4.

Each STA that can take responsibility for the functions of the AP can exchange information with surrounding STAs using, for example, the Action frame including information representing the functions for which the STA can take responsibility.

First, with reference to a sequence in FIG. 5, a series of operations will be described that are intended to determine the role of each STA. Note that operations using the Action frame and the Beacon frame will be described here for convenience but that, instead of these frames, the Management frame may be used.

Here, the user is assumed to specify that the STA 2, which can operate as an AC, operates as an AC. Specifying the operation as an AC is performed by, for example, operating the STA 2.

In a case where the operation as an AC is specified, the STA 2 transmits the Action frame including Role Available Information Element in step S11. Role Available Information Element included in the Action frame transmitted by the STA 2 contains information indicating that the STA 2 can operate as an AC.

The Action frame transmitted from the STA 2 is received by the STA 1 in step S1 and received by the STA 3 in step S21. Additionally, the Action frame transmitted from the STA 2 is received by the STA 4 in step S31.

For example, the STA 1 and the STA 4, included in the STAs having received the Action frame transmitted from the STA 2, are assumed to be communication apparatuses that can connect to the Internet.

In this case, in step S2, the STA 1 transmits the Action frame including the Role Available Information Element. Role Available Information Element included in the Action frame transmitted by the STA 1 contains information indicating that the STA 1 can operate as an IG.

The Action frame transmitted from the STA 1 is received by the STA 2 in step S12 and received by the STA 3 in step S22. The STA 1 and the STA 4 are prevented from communicating directly with each other, and thus the Action frame transmitted from the STA 1 does not reach the STA 4.

On the other hand, in step S32, the STA 4 transmits the Action frame including Role Available Information Element. Role Available Information Element included in the Action frame transmitted by the STA 4 contains information indicating that the STA 4 can operate as an IG.

The Action frame transmitted from the STA 4 is received by the STA 2 in step S13 and received by the STA 3 in step S23. The STA 1 and the STA 4 are prevented from communicating directly with each other, and thus the Action frame transmitted from the STA 4 does not reach the STA 1.

In response to reception of the Action frame transmitted from the STA 1 operating as an IG and the Action frame transmitted from the STA 4, the STA 2 operating as an AC determines that a network with the functions of the AP distributed has been enabled to be operated.

In step S14, the STA 2 transmits the Beacon frame including Role Separate Information Element. Information representing the role of each STA is described in Role Separate Information Element included in the Beacon frame transmitted by the STA 2.

The STA 2, having transmitted the Beacon frame, performs in step S15 configuration for operating as an AC.

The Beacon frame transmitted from the STA 2 is received by the STA 1 in step S3 and received by the STA 3 in step S24. Additionally, the Beacon frame transmitted from the STA 2 is received by the STA 4 in step S33.

The STA 1, having received in step S3 the Beacon frame transmitted from STA 2, performs in step S4 configuration for operating as an IG.

On the other hand, the STA 3, having received in step S24 the Beacon frame transmitted from the STA 2, performs in step S25 configuration for operating as a Station. The STA 3 makes Internet connection using, for example, the STA 1 operating as an IG.

Additionally, the STA 4, having received in step S33 the Beacon frame transmitted from STA 2, performs in step S34 configuration for operating as an IG.

The above-described processing allows construction of a network in which the functions of the AP are distributed and which includes the two IGs.

FIG. 6 is a diagram illustrating a configuration example of Role Available Information Element.

As illustrated in FIG. 6, Role Available Information Element includes IE Type, Length, ESS ID, Own MAC Address, Controller Available, Gateway Available, and Intelligence Available.

IE Type indicates a format of an information element.

Length indicates an information length of the information element.

ESS ID indicates an identifier of an extended service set configured as needed.

Own MAC Address indicates a MAC address of the communication apparatus.

Controller Available is a flag indicating whether or not the communication apparatus can operate as an AC. In the example in FIG. 5, a value indicating that the communication apparatus can operate as an AC is configured in Controller Available in Role Available Information Element included in the Action frame transmitted by STA 2.

Gateway Available is a flag indicating whether or not the communication apparatus can operate as an IG. In the example in FIG. 5, for example, Gateway Available in Role Available Information Element included in the Action frame transmitted by the STA 1 and the STA 4 is configured with a value indicating that the communication apparatus can operate as an IG.

Intelligence Available is a flag indicating whether or not the communication apparatus can operate as an Intelligence Controller. The communication apparatus used as an Intelligence Controller executes authentication in the network and processing related to association with the network. Specifically, the Intelligence Controller includes an authentication function for the network and a function for processing an association request to the network, the functions being included in the known functions of the AP.

As described above, the functions of the AP can be subdivided into more functions and some of the resultant functions of the AP can be shared with other communication apparatuses. In a case where the functions of the Intelligence Controller are shared, the STA that can operate as an Intelligence Controller transmits the Action frame including Role Available Information Element configured with, as a value of Intelligence Available, a value indicating that the STA can operate as an Intelligence Controller.

By using the Action frame including the information as illustrated in FIG. 6, each STA can transmit the functions for which the STA can take responsibility to the other STAs. Additionally, each STA can check, on the basis of the Action frame transmitted from another STA, whether or not any of the STAs in the network to which the subject STA belongs takes responsibility for each function of the AP.

FIG. 7 is a diagram illustrating a configuration example of Role Separate Information Element.

As illustrated in FIG. 7, Role Separate Information Element includes IE Type, Length, SSID, ESS ID, Controller Address, Gateway Address 1, Gateway Address 2, and Intelligence Address. IE Type, Length, and ESS ID are respectively the same as IE Type, Length, and ESS ID described with reference to FIG. 6. SSID is a service set identifier configured as needed.

Controller Address indicates an address of the STA operating as an AC.

Gateway Address 1 indicates an address of the STA operating as an Internet Gateway 1.

Gateway Address 2 indicates an address of the STA operating as an Internet Gateway 2.

Intelligence Address indicates an address of the STA operating as an Intelligence Controller.

Figure 5:
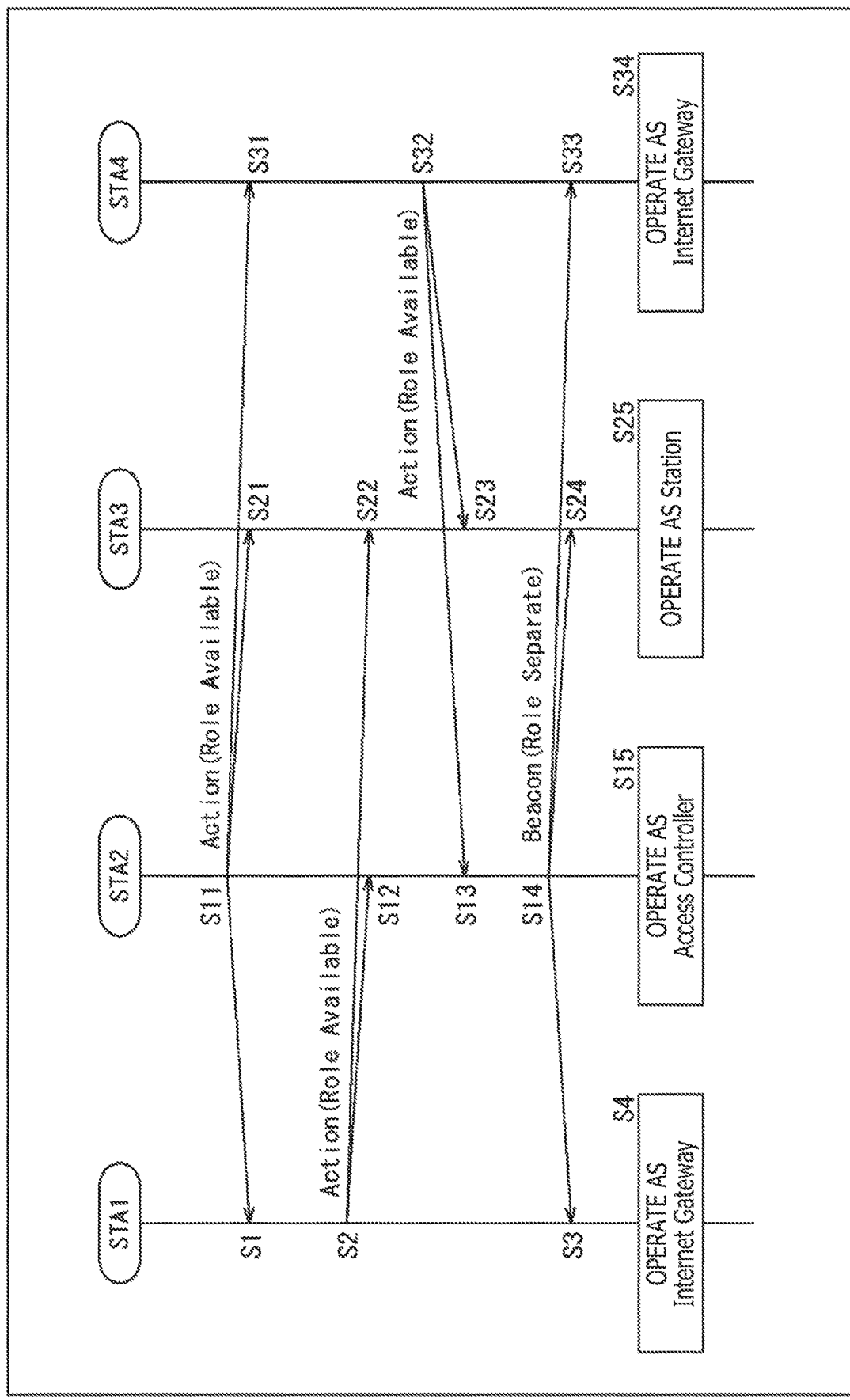
FIG. 5 is a sequence diagram illustrating a series of operations for determining roles of the communication apparatuses.

In the example in FIG. 5, the address of the STA 2 itself is configured in Controller Address of Role Separate Information Element included in the Beacon frame transmitted by the STA 2, and the address of the STA 1 is configured in Gateway Address 1 of Role Separate Information Element. The address of the STA 1 configured as Gateway Address 1 is, for example, identified in the STA 2 on the basis of Own MAC Address of Role Available Information Element in the Action frame transmitted by the STA 1.

Additionally, the address of the STA 4 is configured in Gateway Address 2 included in the Beacon frame transmitted by the STA 2. The address of the STA 4 configured as Gateway Address 2 is, for example, identified in the STA 2 on the basis of Own MAC Address of Role Available Information Element in the Action frame transmitted by the STA 4.

By using the Beacon frame including information as illustrated in FIG. 7, the STA operating as an AC can transmit the address of each of the STAs taking responsibility for the functions of the AP to the other STAs. Additionally, each of the STAs can identify, on the basis of the Beacon frame transmitted from the STA operating as an AC, the address of each of the other STAs taking responsibility for the functions of the AP and belonging to the network to which the subject STA belongs.

One STA may be enabled to perform a plurality of functions of the AP. In this case, the address of the same STA is configured in two or more of Controller Address, Gateway Address, and Intelligence Address.

Additionally, the addresses of three or more IGs may be enabled to be described in Role Separate Information Element. Here, the addresses of two IGs are each described as Gateway Address. However, any number of addresses may each be configured as Gateway Address between Controller Address and Intelligence Address. In a configuration other than this configuration, the number of apparatuses operating as IGs may be separately described (not illustrated).

When the roles of the STAs are determined, the STAs transmit and receive the Action frame including Role Available Information Element as management information and the Beacon frame including Role Separate Information Element as management information as described above.

<Example of Selection of IG>

Now, description will be given of selection of the IG used for Internet connection in a case where a plurality of IGs is present within the network.

Figure 8:
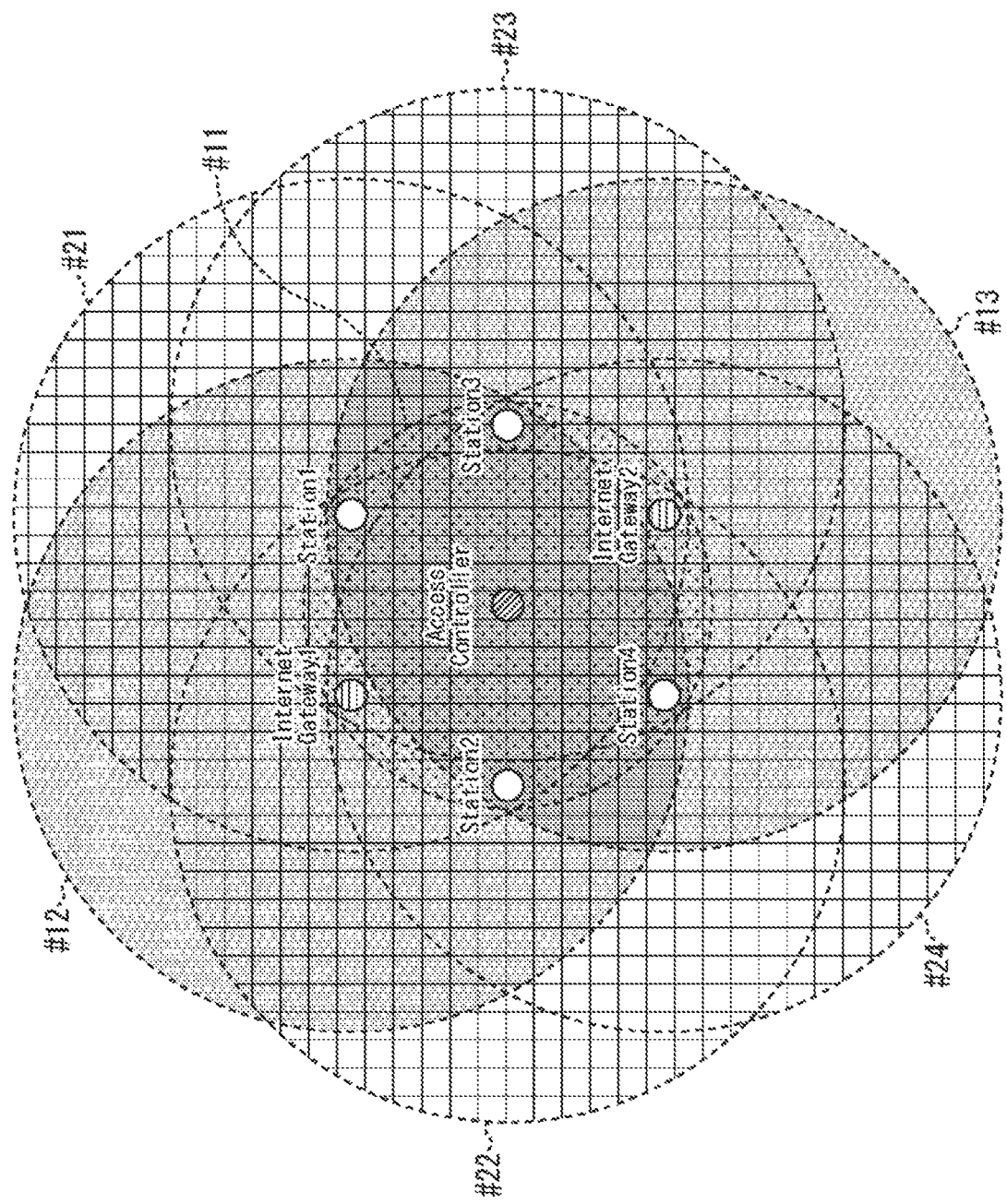
FIG. 8 is a diagram illustrating a configuration example of a network.

FIG. 8 is a diagram illustrating a configuration example of the network.

The network illustrated in FIG. 8 is similar to the network described with reference to FIG. 1 except for extended reachable ranges of radio waves from the Internet Gateways 1 and 2 and the Stations 1 to 4 operating while performing no transmission power control. Since no transmission power control is performed, transmitted signals reach the outside of the desired range of the network.

In the example in FIG. 8, the reachable range of radio waves from the Internet Gateway 1, indicated by the circle #12, is extended to a range including the Stations 3 and 4. Additionally, the reachable range of radio waves from the Internet Gateway 2, indicated by the circle #13, is extended to a range including the Stations 1 and 2.

Each of the Stations 1 and 2 can communicate with the Internet Gateway 1 and the Internet Gateway 2. Each of the Stations 3 and 4 can similarly communicate with the Internet Gateway 1 and the Internet Gateway 2.

Each of the Stations selects, as an IG used for Internet connection, for example, the IG located closest to the Station. For example, the IG located closest to the Stations 3 and 4 is the Internet Gateway 2.

With reference to a sequence in FIG. 9, a series of steps of processing will be described in which the IG used for Internet connection is selected.

Figure 9:
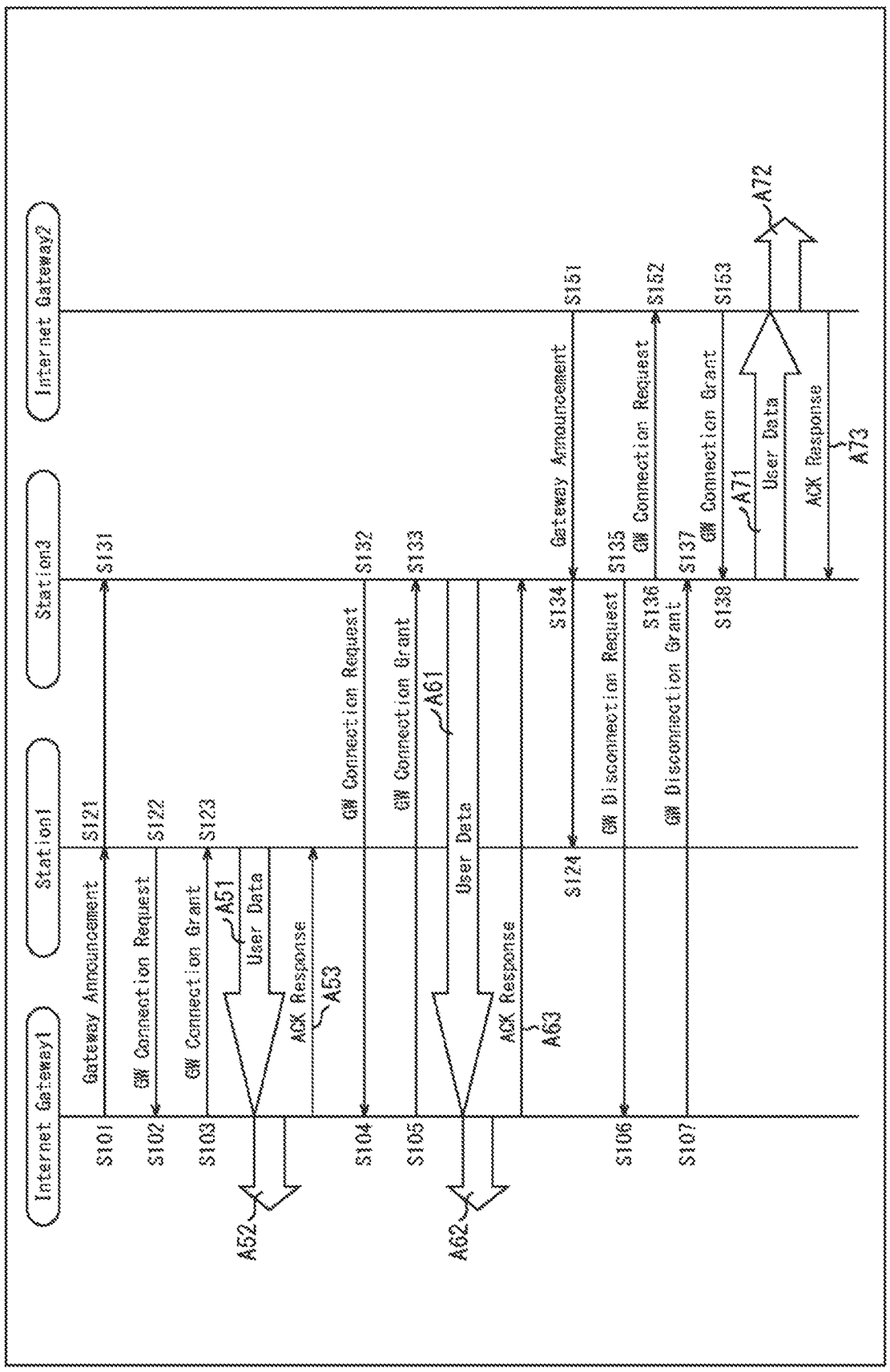
FIG. 9 is a sequence diagram illustrating a series of steps of processing for selecting an IG used for Internet connection.

FIG. 9 illustrates processing of the Internet Gateways 1 and 2 and processing of the Stations 1 and 3. The Station 2 executes processing similar to the processing of the Station 1. The Station 4 executes processing similar to the processing of the Station 3. It is assumed that only the Internet Gateway 1 is initially present as an IG and that the Internet Gateway 2 is subsequently configured.

In step S101, the Internet Gateway 1 transmits a Gateway Announcement frame indicating that the Internet Gateway 1 operates as an IG.

The Gateway Announcement frame may include the Action frame or include a Management frame. In a case where the Internet Gateway 1 also functions as an AC, the information in the Gateway Announcement frame may be included in the Beacon frame for transmission.

The Gateway Announcement frame transmitted from the Internet Gateway 1 is received by the Station 1 in step S121 and received by the Station 3 in step S131.

The Station 1 receives the Gateway Announcement frame, and in the case of, for example, performing Internet connection and uploading User Data to an external apparatus, transmits to the Internet Gateway 1 a Gateway Connection Request frame including connection request information representing a request for Internet connection in step S122.

In step S102, the Internet Gateway 1 receives the Gateway Connection Request frame transmitted from the Station 1.

In the case of accepting the request from the Station 1, the Internet Gateway 1 returns a Gateway Connection Grant frame in step S103. The Gateway Connection Grant frame transmitted by the Internet Gateway 1 is grant information representing grant of Internet connection via the Internet Gateway 1.

In step S123, the Station 1 receives the Gateway Connection Grant frame transmitted from the Internet Gateway 1. This enables the Station 1 to connect to the Internet via the Internet Gateway 1 to communicate with an external apparatus.

For example, uplink User Data is transmitted from the Station 1 to the Internet Gateway 1 as indicated by blank arrow A51 and is transmitted via the Internet Gateway 1 to an external apparatus as indicated by blank arrow A52. An ACK representing receipt acknowledgement is returned from the Internet Gateway 1 to the Station 1 as indicated by arrow A53.

The Station 3, having received the Gateway Announcement frame from the Internet Gateway 1, executes similar processing.

Specifically, in step S132, the Station 3 transmits to the Internet Gateway 1 the Gateway Connection Request frame requesting Internet connection.

In step S104, the Internet Gateway 1 receives the Gateway Connection Request frame transmitted from the Station 3.

In the case of accepting the request from the Station 3, the Internet Gateway 1 returns the Gateway Connection Grant frame in step S105.

In step S133, the Station 3 receives the Gateway Connection Grant frame transmitted from the Internet Gateway 1. This enables the Station 3 to connect to the Internet via the Internet Gateway 1 to communicate with an external apparatus.

Uplink User Data is transmitted from the Station 3 to the Internet Gateway 1 as indicated by blank arrow A61 and is transmitted via the Internet Gateway 1 to the external apparatus as indicated by blank arrow A62. The ACK representing receipt acknowledgement is returned from the Internet Gateway 1 to the Station 3 as indicated by arrow A63. In this manner, the Station 3 located away from the Internet Gateway 1 can communicate with the Internet Gateway 1 unless transmission power is reduced.

Here, it is assumed that the processing described with respect to FIG. 5 is executed to configure the Internet Gateway 2 in the network.

In step S151, the Internet Gateway 2 transmits the Gateway Announcement frame indicating that the Internet Gateway 2 operates as an IG.

The Gateway Announcement frame transmitted from the Internet Gateway 2 is received by the Station 1 in step S124 and received by Station 3 in step S134.

The Station 1, having received the Gateway Announcement frame, selects maintenance of the Internet connection using the Internet Gateway 1. The determination in this case is made, for example, on the basis of parameters included in the Gateway Announcement frame or on the basis of a radio wave reception status.

Here, for example, in a case where the Internet Gateway 1 has a higher radio wave reception intensity than the Internet Gateway 2, maintenance of the Internet connection using the Internet Gateway 1 is selected. The Internet connection of the Station 1 remains active via the Internet Gateway 1.

On the other hand, the Station 3, having received the Gateway Announcement frame, selects making of Internet connection using the Internet Gateway 2. The determination in this case is also made, for example, on the basis of the parameters included in the Gateway Announcement frame or on the basis of the radio wave reception status.

For example, in a case where the Internet Gateway 2 has a higher radio wave reception intensity than the Internet Gateway 1, the Internet Gateway 2 is determined to be more suitable, and the use of the Internet Gateway 2 instead of the Internet Gateway 1 is selected.

In step S135, the Station 3 transmits to the Internet Gateway 1 operating as an existing IG a Gateway Disconnection Request frame including cancel request information representing a request for cancellation of the Internet connection.

Additionally, in step S136, the Station 3 transmits to the Internet Gateway 2 the Gateway Connection Request frame requesting Internet connection.

In step S106, the Internet Gateway 1 receives the Gateway Disconnection Request frame transmitted from the Station 3.

In the case of accepting the request from the Station 3, the Internet Gateway 1 returns a Gateway Disconnection Grant frame in step S107. The Gateway Disconnection Grant frame transmitted by the Internet Gateway 1 is grant information representing grant of cancellation of Internet connection via the Internet Gateway 1.

In step S137, the Station 3 receives the Gateway Disconnection Grant frame transmitted from the Internet Gateway 1. This disables the Station 3 from connecting to the Internet via the Internet Gateway 1.

On the other hand, in step S152, the Internet Gateway 2 receives the Gateway Connection Request frame transmitted from the Station 3.

In the case of accepting the request from the Station 3, the Internet Gateway 2 returns the Gateway Connection Grant frame in step S153.

In step S138, the Station 3 receives the Gateway Connection Grant frame transmitted from the Internet Gateway 2. This enables the Station 3 to connect to the Internet via the Internet Gateway 2 to communicate with an external apparatus.

Uplink User Data is transmitted from the Station 3 to the Internet Gateway 2 as indicated by blank arrow A71 and is transmitted via the Internet Gateway 2 to the external apparatus as indicated by blank arrow A72. The ACK representing receipt acknowledgement is returned from the Internet Gateway 2 to the Station 3 as indicated by arrow A73.

As described above, in the network in which the plurality of IGs is present, each Station can select, for example, the closest IG as an IG suitable for the Station and establish Internet connection via the selected IG. Additionally, even in a case where any IG has been selected, each Station can switch from the selected existing IG to another IG and make Internet connection to the other IG.

In a case where a plurality of IGs is present within the network, Internet connection is made using the closest IG to allow a reduction in transmission power for radio waves between each Station and the IG.

For example, processing illustrated in FIG. 9 is executed to enable the Stations 1 and 2 in FIG. 8 to reduce the transmission power for radio waves to allow the radio waves to reach the range including the Access Controller and the Internet Gateway 1. Further, the Stations 3 and 4 in FIG. 8 are enabled to reduce the transmission power for radio waves to allow the radio waves to reach the range including the Access Controller and the Internet Gateway 2.

The Internet Gateway 1 can reduce the transmission power for radio waves to allow the radio waves to reach the range including the Access Controller and the Stations 1 and 2 which make Internet connections using the Internet Gateway 1. The Internet Gateway 2 can reduce the transmission power for radio waves to allow the radio waves to reach the range including the Access Controller and the Stations 3 and 4 which make Internet connections using the Internet Gateway 2.

The Stations 1 to 4 and the Internet Gateways 1 and 2 thus reduce the transmission power for radio waves, contributing to construction of a network in which the reachable range of radio waves from each apparatus is as described with reference to FIG. 1.

<Example of Data Transmission Using Spatial Multiplexing Communication>

With a plurality of IGs present within the network, data transmission may be performed using spatial multiplexing communication.

Figure 10:
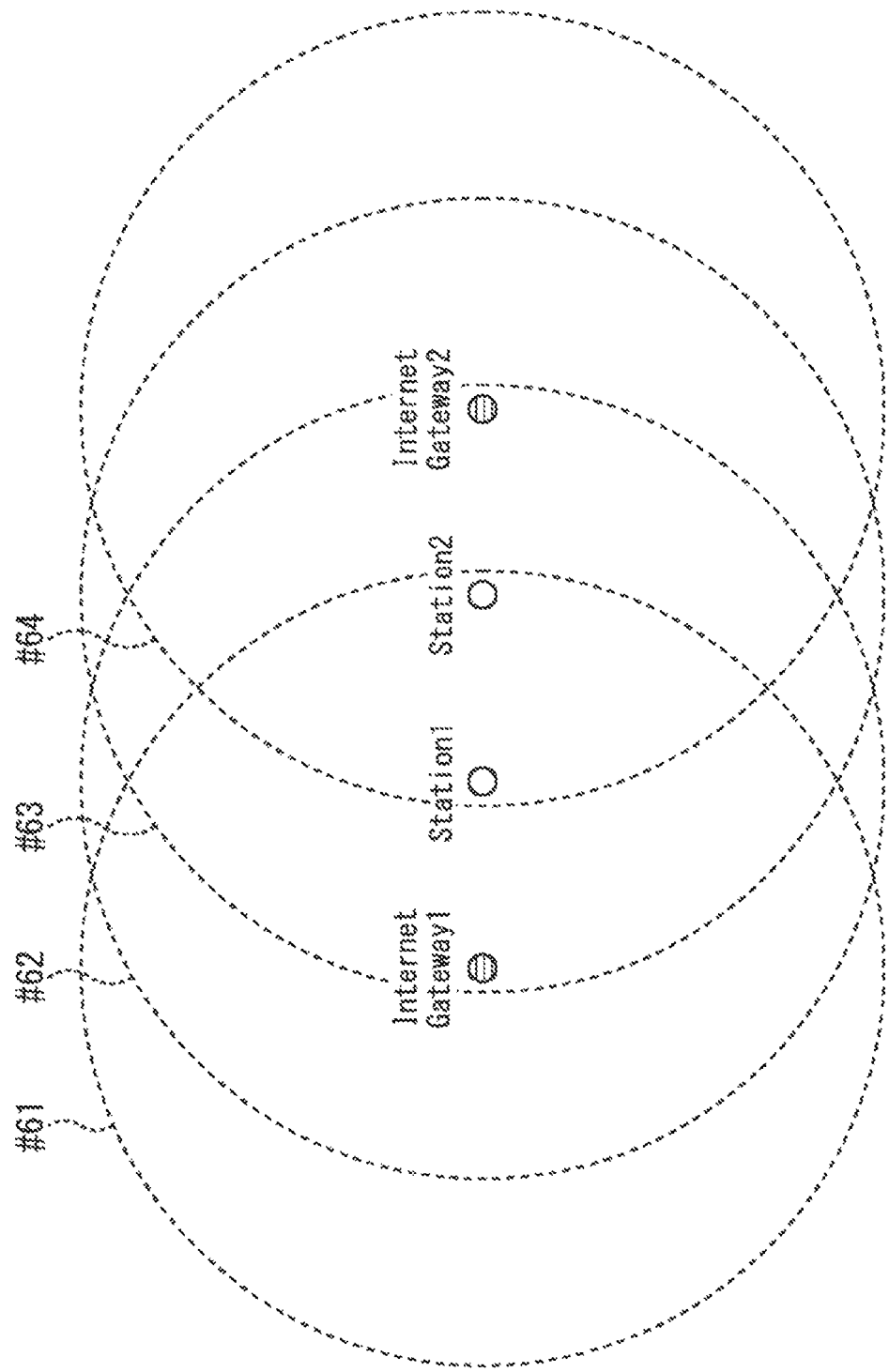
FIG. 10 is a diagram illustrating another configuration example of a network.

FIG. 10 is a diagram illustrating another configuration example of the network.

As illustrated in FIG. 10, a positional relation is assumed in which the Internet Gateway 1, the Station 1, the Station 2, the and the Internet Gateway 2 are arranged in this order from the left. The AC is present at a predetermined position within the network. Circles #61 to #64 respectively represent the reachable ranges of radio waves from the Internet Gateway 1, the Station 1, the Station 2, and the Internet Gateway 2.

In this example as well, each STA can communicate directly with the STA two STAs ahead but fails to communicate with the STAs further ahead. Specifically, the Internet Gateway 1 fails to communicate directly with the Internet Gateway 2.

With reference to a sequence in FIG. 11, a series of steps of processing will be described in which data transmission based on spatial multiplexing communication is performed between each Station and the closest IG.

In step S201, the Internet Gateway 1 transmits the Gateway Announcement frame indicating that the Internet Gateway 1 operates as an IG.

The Gateway Announcement frame transmitted from the Internet Gateway 1 is received by the Station 1 in step S211 and received by Station 2 in step S221.

In step S231, the Internet Gateway 2 transmits the Gateway Announcement frame indicating that the Internet Gateway 2 operates as an IG.

The Gateway Announcement frame transmitted from the Internet Gateway 2 is received by the Station 1 in step S212 and received by Station 2 in step S222.

The Station 1, having received the Gateway Announcement frame from both the Internet Gateway 1 and the Internet Gateway 2, selects the Internet Gateway 1 which is estimated to be the closest IG on the basis of a radio wave intensity and the like.

In step S213, the Station 1 transmits to the Internet Gateway 1 the Gateway Connection Request frame requesting Internet connection.

In step S202, the Internet Gateway 1 receives the Gateway Connection Request frame transmitted from the Station 1.

In the case of accepting the request from the Station 1, the Internet Gateway 1 returns the Gateway Connection Grant frame in step S203.

In step S214, the Station 1 receives the Gateway Connection Grant frame transmitted from the Internet Gateway 1. This enables the Station 1 to be connected to the Internet via the Internet Gateway 1 to communicate with an external apparatus.

On the other hand, the Station 2, having received the Gateway Announcement frame from both the Internet Gateway 1 and the Internet Gateway 2, selects the Internet Gateway 2 which is estimated to be the closest IG on the basis of a received radio wave intensity and the like.

In step S223, the Station 2 transmits to the Internet Gateway 2 the Gateway Connection Request frame requesting Internet connection.

In step S232, the Internet Gateway 2 receives the Gateway Connection Request frame transmitted from the Station 2.

In the case of accepting the request from the Station 2, the Internet Gateway 2, returns the Gateway Connection Grant frame in step S233.

In step S224, the Station 2 receives the Gateway Connection Grant frame transmitted from the Internet Gateway 2. This enables the Station 2 to be connected to the Internet via the Internet Gateway 2 to communicate with an external apparatus.

Here, for communication between the Internet Gateway 1 and the Station 1 and communication between the Internet Gateway 2 and the Station 2, the transmission power is adjusted to provide a minimum necessary reachable range of radio waves, User Data is transmitted as indicated by blank arrows A102 and A112, and the ACK is returned as indicated by arrows A103 and A113.

Figure 12:
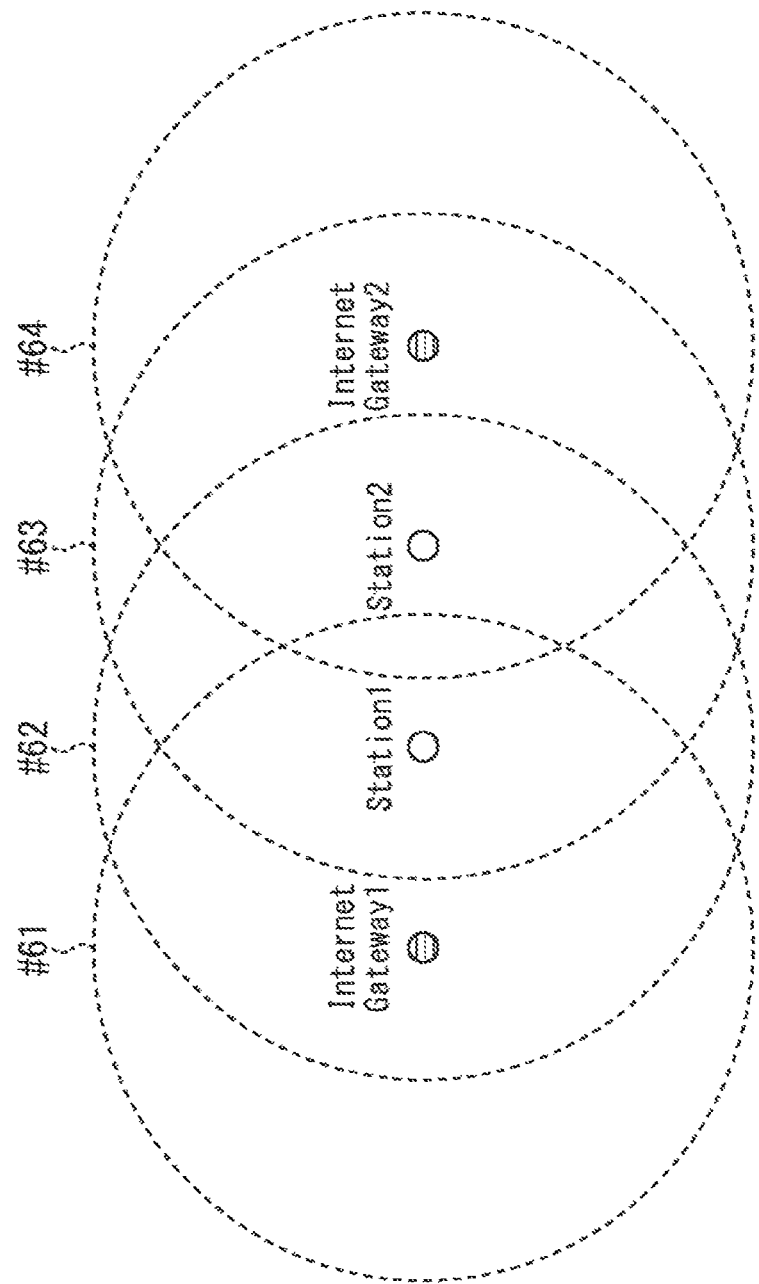
FIG. 12 is a diagram illustrating an example of adjustment of transmission power for radio waves.

FIG. 12 is a diagram illustrating an example of adjustment of the transmission power for radio waves.

As indicated by circle #61, the reachable range of radio waves from the Internet Gateway 1 is adjusted to include the Station 1 and the AC.

As indicated by circle #62, the reachable range of radio waves from the Station 1 is adjusted to include at least the Internet Gateway 1 and the AC.

As indicated by circle #63, the reachable range of radio waves from the Station 2 is adjusted to include at least the Internet Gateway 2 and the AC.

As indicated by circle #64, the reachable range of radio waves from the Internet Gateway 2 is adjusted to include the Station 2 and the AC.

In a case where the reachable range of radio waves from each STA is adjusted as illustrated in FIG. 12, downlink data transmitted by the Internet Gateway 1 and destined for the Station 1 does not reach the Station 2. Additionally, downlink data transmitted by the Internet Gateway 2 and destined for the Station 2 does not reach the Station 1.

Transmission of downlink data to the Station 1 by the Internet Gateway 1 and transmission of downlink data from the Internet Gateway 2 to the Station 2 can be performed, for example, with timings for the transmissions overlapping. Additionally, reception of downlink data by the Station 1 and reception of downlink data by the Station 2 can be performed, for example, with timings for the receptions overlapping.

Figure 11:
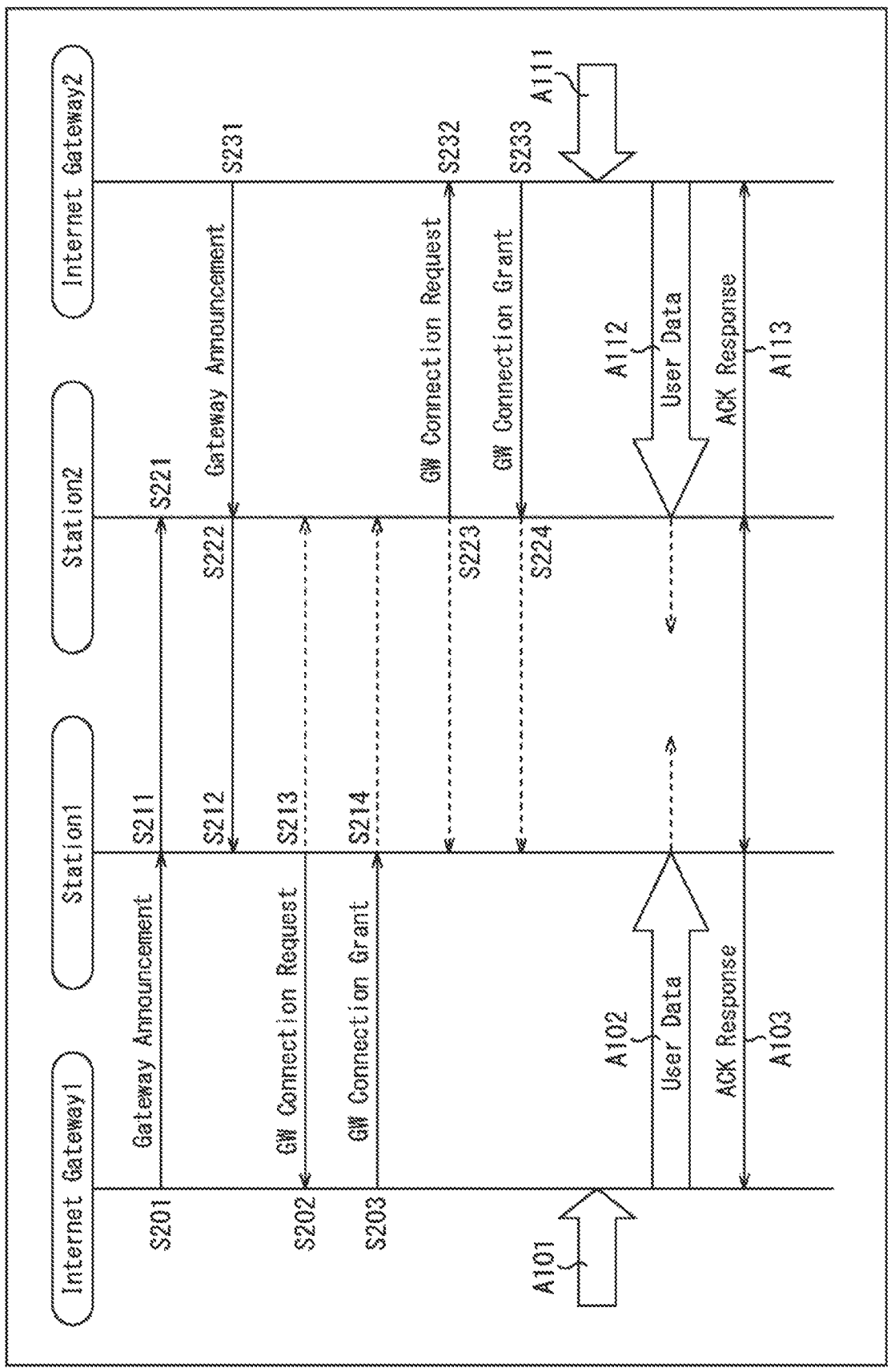
FIG. 11 is a sequence diagram illustrating a series of steps of processing for data transmission using spatial multiplexing communication.

Specifically, as indicated by blank arrow A101 in FIG. 11, downlink User Data destined for the Station 1, which has been transmitted by an external apparatus via the Internet and received at the Internet Gateway 1 via the Internet, is transmitted from the Internet Gateway 1 to the Station 1 as indicated by blank arrow A102.

Additionally, as indicated by blank arrow A111, downlink User Data destined for the Station 2, which has been transmitted by an external apparatus via the Internet and received at the Internet Gateway 2 via the Internet, is transmitted from the Internet Gateway 2 to the Station 2 as indicated by blank arrow A112.

Transmission of User Data from the Internet Gateway 1 to the Station 1 illustrated by blank arrow A102 and transmission of User Data from the Internet Gateway 2 to the Station 2 illustrated by blank arrow A112 are, for example, timed to take place simultaneously.

Return of the ACK from the Station 1 to the Internet Gateway 1 illustrated by arrow A103 and return of the ACK from the Station 2 to the Internet Gateway 2 illustrated by arrow A113 are, for example, timed to take place simultaneously.

The transmission timing for User Data and the return timing for the ACK may be specified by information included in a Trigger frame transmitted by the AC.

In a network in which a plurality of IGs is present, each Station selects the closest IG, and the IG and the Station optimize the transmission power for radio waves, enabling spatial multiplexing communication. This enables utilization efficiency of transmission paths to be improved.

<Example of Frame Format>

Now, a configuration of each of the frames used for the above-described processing will be described.

FIG. 13 is a diagram illustrating a configuration example of the Gateway Announcement frame.

As described above, the Gateway Announcement frame includes the Action frame or the Management frame. The Gateway Announcement frame is transmitted from the Internet Gateway to neighboring Stations. In a case where one STA takes responsibility for the functions of the IG and the AC, the information in the Gateway Announcement frame is included in the Beacon frame for transmission.

As illustrated in FIG. 13, the Gateway Announcement frame includes Frame Control, Duration, Broadcast Address, Gateway Address, BSS ID, Sequence Control, ESS ID, Gateway Parameter, Gateway Attribute, and Gateway Control. An FCS including an error detection code is added to a tail end of each of these pieces of information to form the Gateway Announcement frame.

Frame Control represents a type of the frame.

Duration represents a duration of the frame.

Broadcast Address represents an address of a destination of the Gateway Announcement frame.

Gateway Address represents an address of a source of the Gateway Announcement frame.

BSS ID is an identifier of the BSS to which the communication apparatus belongs.

Sequence Control represents a sequence number or the like.

ESS ID is an identifier of an ESS.

Gateway Parameter includes parameters related to Internet connection capabilities (specifications). Gateway Parameter includes parameters included in the parameters related to the Internet connection capabilities and varying with state.

Gateway Attribute also includes parameters related to the Internet connection capabilities. Gateway Attribute includes invariable parameters corresponding to attributes of the IG, the invariable parameters being included in the parameters related to the Internet connection capabilities.

Gateway Control is information related to control of the IG. Gateway Control includes, for example, parameters configured by a user and parameters configured in accordance with instructions from a predetermined apparatus on the network.

Gateway Parameter, Gateway Attribute, and Gateway Control will be described below in detail.

FIG. 14 is a diagram illustrating a configuration example of the Gateway Connection Request frame.

The Gateway Connection Request frame includes the Action frame or the Management frame. The Gateway Connection Request frame is transmitted from the Station to the IG to which Internet connection is requested.

As illustrated in FIG. 14, the Gateway Connection Request frame includes Frame Control, Duration, Gateway Address, Transmit Address, BSS ID, Sequence Control, and Another Gateway Address. An FCS is added to a tail end of each of these pieces of information to form the Gateway Connection Request frame.

Frame Control represents a type of the frame.

Duration represents a duration of the frame.

Gateway Address represents an address of a destination of the Gateway Connection Request frame. Gateway Address specifies the IG requesting Internet connection.

Transmit Address represents an address of a source of the Gateway Connection Request frame. Transmit Address represents the Station requesting Internet connection.

BSS ID is an identifier of the BSS to which the communication apparatus belongs.

Sequence Control represents a sequence number or the like.

Another Gateway Address is used in a case where a communication apparatus is present that operates as an IG and that is other than the communication apparatus operating as the destination of the Gateway Connection Request frame, and Another Gateway Address describes the address of the former communication apparatus. In a case where a plurality of communication apparatuses is present that operates as IGs and that is other than the communication apparatus operating as the destination of the Gateway Connection Request frame, Another Gateway Address describes each of the addresses of these communication apparatuses.

FIG. 15 is a diagram illustrating a configuration example of the Gateway Connection Grant frame.

The Gateway Connection Grant frame includes the Action frame or the Management frame. The Gateway Connection Grant frame is transmitted from the IG to the communication apparatus requesting Internet connection in a case where the Internet connection is accepted.

As illustrated in FIG. 15, the Gateway Connection Grant frame includes Frame Control, Duration, Target Address, Gateway Address, BSS ID, Sequence Control, and Another Gateway Address. An FCS is added to a tail end of each of these pieces of information to form the Gateway Connection Grant frame.

Frame Control represents a type of the frame.

Duration represents a duration of the frame.

Target Address represents an address of a destination of the Gateway Connection Grant frame. Target Address specifies the Station for which Internet connection is accepted.

Gateway Address represents an address of a source of the Gateway Connection Grant frame. Gateway Address represents the IG having accepted the Internet connection.

BSS ID is an identifier of the BSS to which the communication apparatus belongs.

Sequence Control represents a sequence number or the like.

Another Gateway Address is used in a case where a communication apparatus is present that operates as an IG and that is other than the communication apparatus operating as the source of the Gateway Connection Grant frame, and Another Gateway Address describes the address of the former communication apparatus. In a case where a plurality of communication apparatuses is present that operates as IGs and that is other than the communication apparatus operating as the source of the Gateway Connection Grant frame, Another Gateway Address describes each of the addresses of these communication apparatuses.

FIG. 16 is a diagram illustrating a configuration example of the Gateway Disconnection Request frame.

The Gateway Disconnection Request frame includes the Action frame or the Management frame. The Gateway Disconnection Request frame is transmitted from the Station to the IG to which cancellation of Internet connection is requested.

As illustrated in FIG. 16, the Gateway Disconnection Request frame includes Frame Control, Duration, Old Gateway Address, Transmit Address, BSS ID, Sequence Control, and New Gateway Address. An FCS is added to a tail end of each of these pieces of information to form the Gateway Disconnection Request frame.

Frame Control represents a type of the frame.

Duration represents a duration of the frame.

Old Gateway Address represents an address of a destination of the Gateway Disconnection Request frame. Old Gateway Address specifies the IG to which cancellation of Internet connection is requested.

Transmit Address represents an address of a source of the Gateway Disconnection Request frame. Transmit Address represents the Station requesting cancellation of Internet connection.

BSS ID is an identifier of the BSS to which the communication apparatus belongs.

Sequence Control represents a sequence number or the like.

New Gateway Address represents an address of the IG as a new connection destination of the Internet connection.

FIG. 17 is a diagram illustrating a configuration example of the Gateway Disconnection Grant frame.

The Gateway Disconnection Grant frame includes the Action frame or the Management frame. The Gateway Disconnection Grant frame is transmitted, in a case where cancellation of Internet connection is accepted, from the IG to the communication apparatus requesting the cancellation of the Internet connection.

As illustrated in FIG. 17, the Gateway Disconnection Grant frame includes Frame Control, Duration, Target Address, Old Gateway Address, BSS ID, Sequence Control, and New Gateway Address. An FCS is added to a tail end of each of these pieces of information to form the Gateway Disconnection Grant frame.

Frame Control represents a type of the frame.

Duration represents a duration of the frame.

Target Address represents an address of a destination of the Gateway Disconnection Grant frame. Target Address specifies the Station for which cancellation of Internet connection is accepted.

Old Gateway Address represents an address of a source of the Gateway Disconnection Grant frame. Old Gateway Address represents the IG itself having accepted the cancellation of the Internet connection.

BSS ID is an identifier of the BSS to which the communication apparatus belongs.

Sequence Control represents a sequence number or the like.

New Gateway Address represents an address of the IG as a new destination of the Internet connection specified by the Station requesting the cancellation of the Internet connection.

<Configuration Example of Communication Apparatus>

Figure 18:
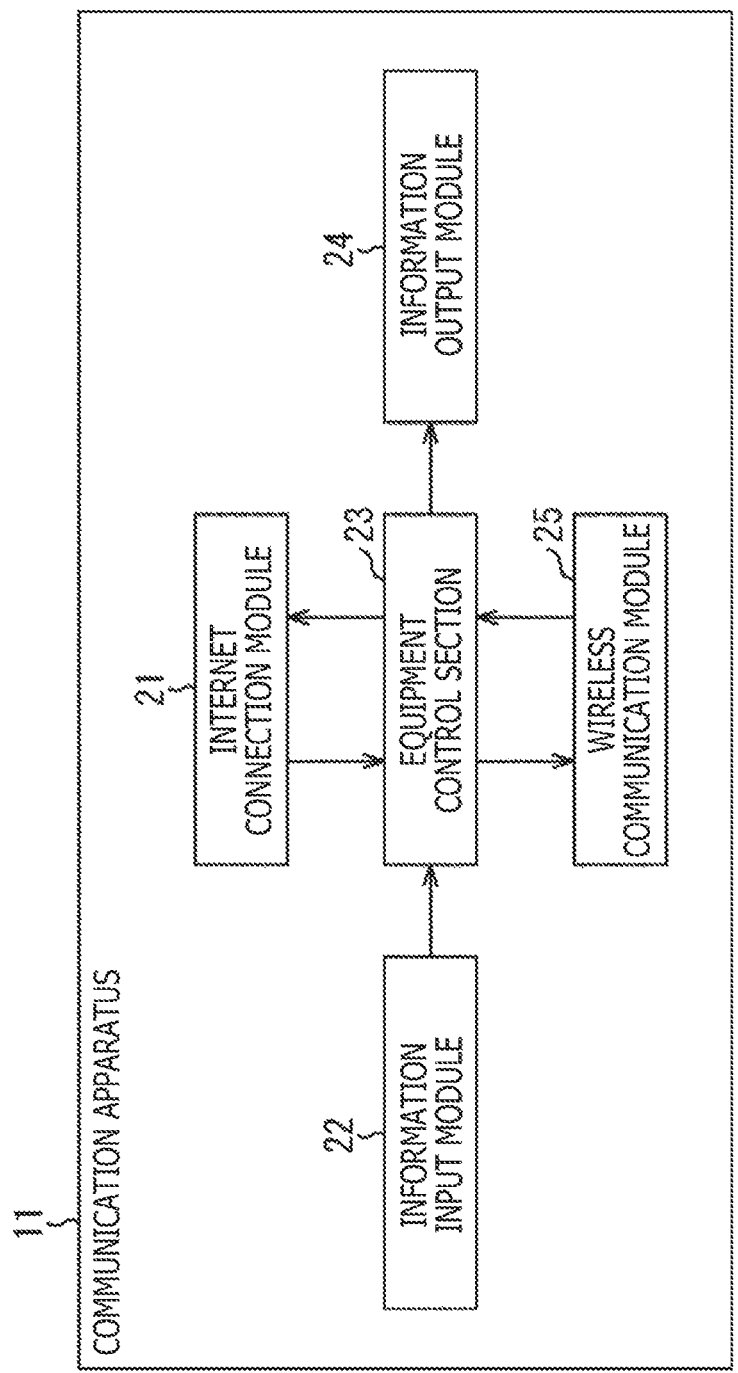
FIG. 18 is a block diagram illustrating a configuration example of a communication apparatus.

FIG. 18 is a block diagram illustrating a configuration example of the communication apparatus.

A communication apparatus 11 illustrated in FIG. 18 is an STA operating as an AC, an IG, a Station, or the like.

The communication apparatus 11 includes, for example, an Internet connection module 21, an information input module 22, an equipment control section 23, an information output module 24, and a wireless communication module 25. The components illustrated in FIG. 18 can be omitted as appropriate according to the functions for which each communication apparatus 11 takes responsibility.

The Internet connection module 21 functions as a communication modem for connection to the Internet in a case where the communication apparatus 11 operates as an IG. Specifically, the Internet connection module 21 outputs to the equipment control section 23 data received via the Internet and transmits data fed from the equipment control section 23 to a destination apparatus via the Internet.

The Internet connection made by the Internet connection module 21 is achieved via a wired communication network or a wireless communication network.

The information input module 22 detects an operation by the user and outputs to the equipment control section 23 information representing the contents of the operation by the user. For example, in a case where a button, a keyboard, a touch panel, or the like provided on a housing of the communication apparatus 11 is operated, the information input module 22 outputs to the equipment control section 23 a signal corresponding to the operation performed by the user.

The equipment control section 23 includes a CPU (Central Processing Unit), a ROM (Read Only Memory), a RAM (Random Access Memory), and the like. The equipment control section 23 uses the CPU to execute a predetermined program and controls operations of the communication apparatus 11 as a whole in accordance with, for example, signals fed from the information input module 22.

For example, the equipment control section 23 outputs to the wireless communication module 25 downlink data fed from the Internet connection module 21 and causes the wireless communication module 25 to transmit the downlink data to the destination communication apparatus. Additionally, the equipment control section 23 acquires from the wireless communication module 25 uplink data transmitted from the communication apparatus belonging to the network and received by the wireless communication module 25 and outputs the uplink data to the Internet connection module 21. The equipment control section 23 causes the information output module 24 to output predetermined information as appropriate.

The information output module 24 includes a display section including a liquid crystal panel, a speaker, and an LED (Light Emitting Diode). On the basis of the information fed from the equipment control section 23, the information output module 24 outputs various types of information such as information representing an operating status of the communication apparatus 11 and information obtained via the Internet to present the information to the user.

The wireless communication module 25 is a module for a wireless LAN complying with predetermined standards. The wireless communication module 25 is configured, for example, as an LSI chip.

The wireless communication module 25 transmits data fed from the equipment control section 23 to another apparatus using a frame in a predetermined format, receives a signal transmitted from another apparatus, and outputs to the equipment control section 23 data extracted from the received signal.

Figure 19:
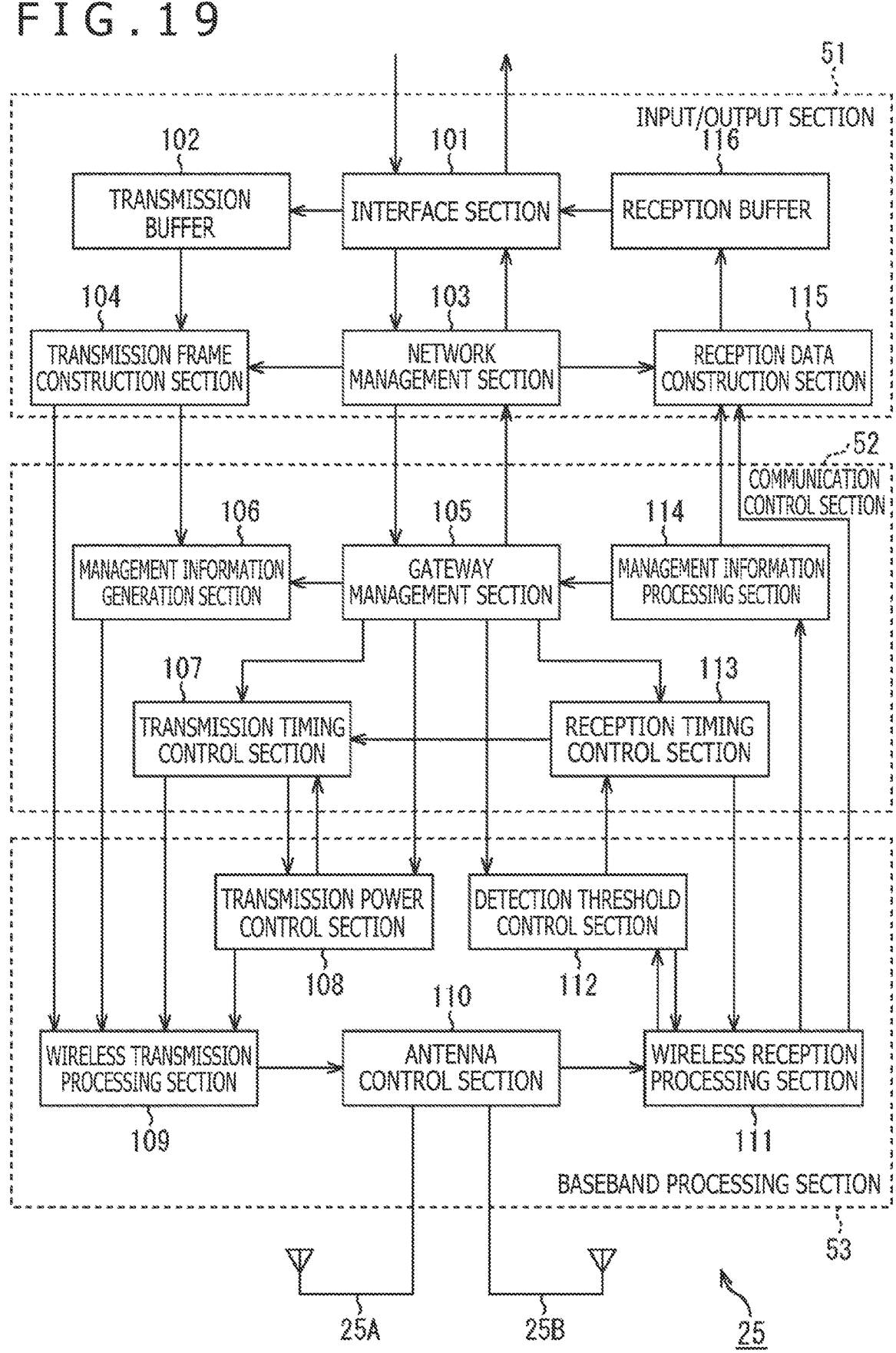
FIG. 19 is a block diagram illustrating a configuration example of functions of a wireless communication module.

FIG. 19 is a block diagram illustrating a configuration example of functions of the wireless communication module 25.

As illustrated in FIG. 19, the wireless communication module 25 includes an input/output section 51, a communication control section 52, and a baseband processing section 53.

The input/output section 51 includes an interface section 101, a transmission buffer 102, a network management section 103, a transmission frame construction section 104, a reception data construction section 115, and a reception buffer 116.

The communication control section 52 includes a gateway management section 105, a management information generation section 106, a transmission timing control section 107, a reception timing control section 113, and a management information processing section 114.

The baseband processing section 53 includes a transmission power control section 108, a wireless transmission processing section 109, an antenna control section 110, a wireless reception processing section 111, and a detection threshold control section 112.

The interface section 101 of the input/output section 51 functions as an interface for exchanging data in the predetermined signal format with the equipment control section 23 in FIG. 18. For example, the interface section 101 outputs to the transmission buffer 102 data to be transmitted fed from the equipment control section 23. Additionally, the interface section 101 outputs to the equipment control section 23 reception data obtained from another communication apparatus 11 and stored in the reception buffer 116.

The transmission buffer 102 temporarily stores the data to be transmitted. The data to be transmitted stored in the transmission buffer 102 is read at a predetermined timing by the transmission frame construction section 104.

The network management section 103 manages information representing functions for which the communication apparatus 11 takes responsibility in the network. For example, in the case of taking responsibility for the functions of the AC, the network management section 103 manages the addresses of the communication apparatuses 11 included in the network.

Additionally, the network management section 103 manages functions for which responsibility is taken by other communication apparatuses 11 belonging to the network, such as the communication apparatus 11 operating as an AC and the communication apparatus 11 operating as an IG. The management of the network by the network management section 103 is based on information fed from the interface section 101 and the gateway management section 105.

The network management section 103 outputs various types of information such as addresses to each of the transmission frame construction section 104, the gateway management section 105, and the reception data construction section 115 as appropriate.

The transmission frame construction section 104 generates a data frame in which the data stored in the transmission buffer 102 is transmitted and outputs the data frame to the wireless transmission processing section 109.

The gateway management section 105 of the communication control section 52 performs various types of control in accordance with the functions of the communication apparatus 11 itself managed by the network management section 103.

For example, in the case of operating as an AC, the gateway management section 105 outputs to the management information generation section 106 management information including information for being stored in the management frame. Additionally, in the case of operating as an AC, the gateway management section 105 performs access control in accordance with a predetermined communication protocol on the basis of, for example, the information managed by the network management section 103.

In the case of operating as an IG, the gateway management section 105 determines grant/rejection of connection of a communication apparatus requesting Internet connection. Determination of grant/rejection of the connection is based, for example, on a connection capacity corresponding to the capability of the communication apparatus 11 itself for Internet connection. In the case of granting the Internet connection, the gateway management section 105 returns the Gateway Connection Grant frame and subsequently manages transmission and reception of User Data by the communication apparatus to which the Internet connection has been granted.

In the case of operating as a Station, the gateway management section 105 selects the IG appropriate as a connection destination on the basis of the information included in the Gateway Announcement frames from the IGs and transmits the Gateway Connection Request frame to the selected IG. In a case where Internet connection is granted, the gateway management section 105 makes the Internet connection via the IG selected as the connection destination.

Transmission of each management frame by the gateway management section 105 is performed by, for example, controlling the management information generation section 106.

The management information generation section 106 generates a management frame including the management information fed from the gateway management section 105 and outputs the management frame to the wireless transmission processing section 109.

The transmission timing control section 107 controls the transmission timing for the transmission of the frame by the wireless transmission processing section 109 on the basis of the predetermined access control protocol. The transmission timing is specified by, for example, the gateway management section 105 or the reception timing control section 113.

The transmission power control section 108 of the baseband processing section 53 controls the transmission power for radio waves under the control of the gateway management section 105 and the transmission timing control section 107.

As described above, the transmission power for radio waves from the communication apparatus 11 operating as an AC is kept at a level where the communication apparatus 11 can communicate with all the communication apparatuses 11 belonging to the network including the IG.

Additionally, the transmission power for radio waves from the communication apparatus 11 operating as an IG is kept at a level where the AC can communicate with the Station making Internet connection using the communication apparatus 11 itself.

The transmission power for radio waves from the communication apparatus 11 operating as a Station is kept at a level where the AC can communicate with the IG used for Internet connection.

The wireless transmission processing section 109 converts into a baseband signal the data frame generated by the transmission frame construction section 104 and the management frame generated by the management information generation section 106. Additionally, the wireless transmission processing section 109 executes various types of signal processing such as modulation processing on the baseband signal and feeds the antenna control section 110 with the baseband signal subjected to the signal processing.

The antenna control section 110 includes a plurality of antennas including antennas 25A and 25B connected together. The antenna control section 110 transmits from the antenna 25A and the antenna 25B a signal fed from the wireless transmission processing section 109. Additionally, in response to reception of a radio wave transmitted from another apparatus, the antenna control section 110 outputs to the wireless reception processing section 111 a signal fed from the antenna 25A and the antenna 25B.

The wireless reception processing section 111 detects, in the signal fed from the antenna control section 110, a preamble of the frame transmitted in the predetermined format and receives data succeeding the preamble and included in a header and a data portion. The wireless reception processing section 111 outputs the data in the management frame such as the Beacon frame to the management information processing section 114 and outputs to the reception data construction section 115 the data in the data frame transmitted from another communication apparatus 11.

The detection threshold control section 112 configures in the wireless reception processing section 111 a threshold used as a reference for detection of a signal such as a preamble. Configuration of the threshold by the detection threshold control section 112 is performed under the control of the gateway management section 105, for example, in a case where control of the transmission power for radio waves is performed in the network.

The reception timing control section 113 of the communication control section 52 controls the reception timing for the reception of the frame by the wireless reception processing section 111. The reception timing is specified, for example, by the gateway management section 105. Information regarding the reception timing for the frame is fed to the transmission timing control section 107 as appropriate on the basis of the predetermined access control protocol.

The management information processing section 114 analyzes the management frame including data fed from the wireless reception processing section 111. In a case where the communication apparatus 11 is specified as a destination of the management frame, the management information processing section 114 extracts parameters stored in the management frame and analyzes the contents of the parameters. The management information processing section 114 outputs information regarding analysis results to the gateway management section 105 and the reception data construction section 115. The management information processing section 114 also analyzes non-data packets as appropriate.

The reception data construction section 115 of the input/output section 51 removes the header from the data frame including the data fed from the wireless reception processing section 111 to extract the data portion. The reception data construction section 115 outputs the data included in the extracted data portion to the reception buffer 116 as reception data.

The reception buffer 116 temporarily stores the reception data fed from the reception data construction section 115. The reception data stored in the reception buffer 116 is read at a predetermined timing by the interface section 101 and output to the equipment control section 23.

The wireless communication module 25 includes the input/output section 51, the communication control section 52, and the baseband processing section 53, including the above-described sections. In a case where the functions of the AP are shared among the plurality of communication apparatuses 11, the operation of each section is switched depending on the functions for which each communication apparatus 11 takes responsibility.

<Operations of Communication Apparatuses>

Now, operations of each of the communication apparatus 11 operating as an IG and the communication apparatus 11 operating as a Station will be described.

Operations of IG

Figure 20:
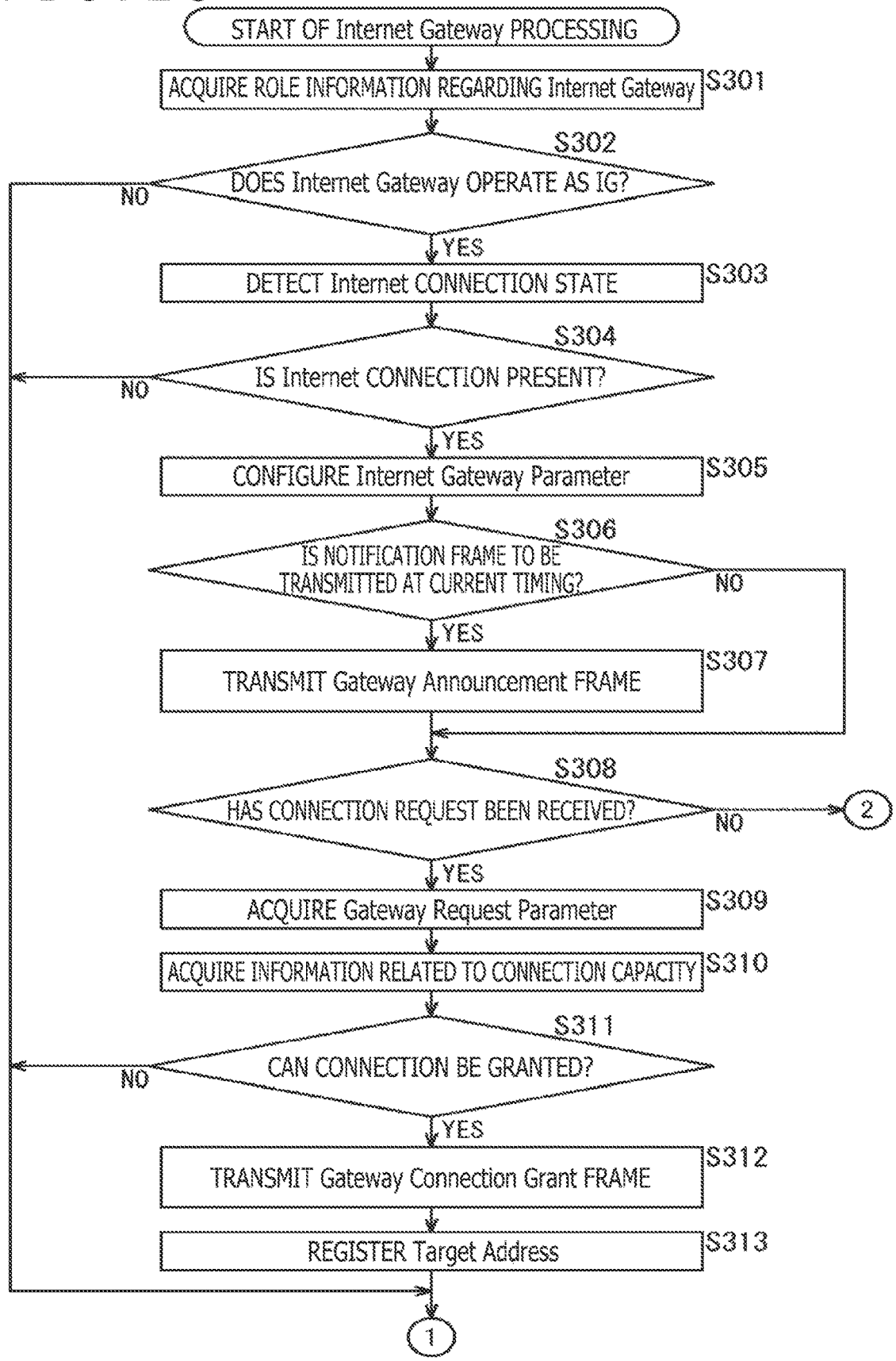
FIG. 20 is a flowchart illustrating processing executed by the IG.

First, processing of the IG will be described with reference to flowcharts in FIG. 20 and FIG. 21.

In step S301, the equipment control section 23 of the IG acquires role information regarding the IG. The role information, including information representing the role (function) played by the IG, is, for example, configured after roles are allocated by the processing described with reference to FIG. 5 and is stored in a memory included in the equipment control section 23.

In step S302, the equipment control section 23 determines whether or not the communication apparatus 11 operates as an IG.

In the case of determining in step S302 that the communication apparatus 11 operates as an IG, the equipment control section 23 acquires in step S303 information representing the operating state of the Internet connection module 21 to detect a connection state of the Internet. The information representing the operating state of the Internet connection module 21 indicates whether or not the IG is connected to the Internet.

In step S304, the equipment control section 23 determines whether or not Internet connection is present.

In a case where the equipment control section 23 determines in step S304 that Internet connection is present, then in step S305, the network management section 103 of the wireless communication module 25 configures Internet Gateway Parameter.

Internet Gateway Parameter is information related to the capability of the IG for Internet connection. Internet Gateway Parameter includes, for example, information related to a provider, information related to a communication speed, and information related to the connection capacity. The information related to the connection capacity identifies the number of Stations to which the IG can grant Internet connection. The information included in Internet Gateway Parameter is included in various frames, which are then transmitted to the other communication apparatuses 11, as appropriate.

In step S306, the gateway management section 105 determines whether or not the Gateway Announcement frame used as a notification frame is to be transmitted at the current timing.

In the case of determining in step S306 that the Gateway Announcement frame is to be transmitted at the current timing, then in step S307, the gateway management section 105 transmits the Gateway Announcement frame.

Here, the Gateway Announcement frame including parameters acquired by the gateway management section 105 is generated by the management information generation section 106. The Gateway Announcement frame generated by the management information generation section 106 is output to the wireless transmission processing section 109 which then transmits the Gateway Announcement frame to the surrounding communication apparatus 11. The Station having received the Gateway Announcement frame specifies as Internet Gateway the communication apparatus 11 having transmitted the Gateway Announcement frame, and in the case of requesting Internet connection, transmits the Gateway Connection Request frame as appropriate.

In a case where the gateway management section 105 determines that the Gateway Announcement frame is not to be transmitted at the current timing in step S306, the processing in step S307 is skipped.

In step S308, the gateway management section 105 determines whether or not the Gateway Connection Request frame used as a connection request for Internet connection has been received.

In the case of being received by the wireless reception processing section 111, the Gateway Connection Request frame is fed to the management information processing section 114 and analyzed. Parameters corresponding to analysis results for the Gateway Connection Request frame are fed from the management information processing section 114 to the gateway management section 105. The Gateway Connection Request frame includes the address of the source Station or the like as described above.

In the case of determining in step S308 that the Gateway Connection Request frame has been received, then in step S309, the gateway management section 105 acquires the parameters for the Gateway Connection Request frame fed from the management information processing section 114.

In step S310, the gateway management section 105 acquires the information related to the connection capacity included in Internet Gateway Parameter managed by the network management section 103.

In step S311, the gateway management section 105 determines, for example, on the basis of the information related to the connection capacity, whether or not Internet connection can be granted to the Station having transmitted the Gateway Connection Request frame.

As described above, the information related to the connection capacity identifies the number of Stations to which the IG can grant Internet connection. For example, in a case where the number of Stations to which Internet connection has already been granted is smaller than the number indicated in the information related to the connection capacity, the gateway management section 105 determines that Internet connection can be granted.

In the case of determining in step S311 that Internet connection can be granted to the Station having transmitted the Gateway Connection Request frame, then in step S312, the gateway management section 105 returns the Gateway Connection Grant frame.

Here, the management information generation section 106 generates the Gateway Connection Grant frame including the parameters acquired by the gateway management section 105. The Gateway Connection Grant frame generated by the management information generation section 106 is output to the wireless transmission processing section 109 which then transmits the Gateway Connection Grant frame to the Station having transmitted the Gateway Connection Request frame.

In step S313, the gateway management section 105 registers the address of the Station having transmitted the Gateway Connection Request frame as Target Address. After registering the address, the gateway management section 105 controls the Internet connection made by the Station with the address registered as Target Address. Target Address is the address of the Station to which Internet connection is granted. After the registration of Target Address, the processing ends.

In a case where the equipment control section 23 determines in step S302 that the communication apparatus 11 does not operate as an IG, a case where the equipment control section 23 determines in step S304 that the IG is not connected to the Internet, or a case where the gateway management section 105 determines in step S311 that granting Internet connection is disabled, the processing also ends.

Figure 21:
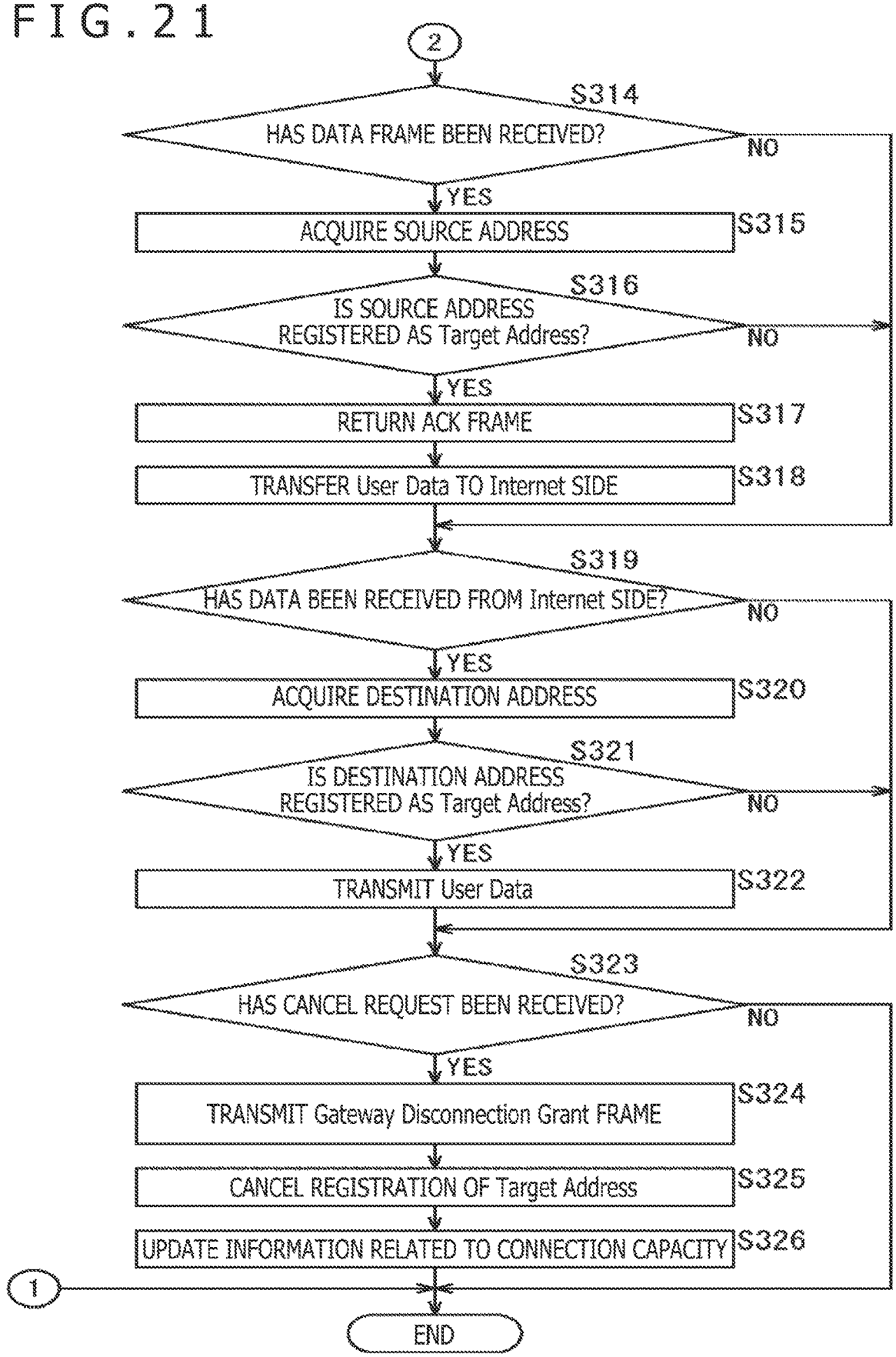
FIG. 21 is a flowchart continued from FIG. 20 and illustrating the processing executed by the IG.

On the other hand, in a case where the gateway management section 105 determines in step S308 that the Gateway Connection Request frame has not been received, the processing proceeds to step S314 (FIG. 21).

In step S314, the gateway management section 105 determines whether or not a data frame transmitted by a predetermined Station has been received. The data frame includes uplink User Data transmitted by the Station.

The data frame received by the wireless reception processing section 111 is analyzed by the reception data construction section 115, and the User Data is extracted. The data frame includes the address of the source of the data frame. The address of the source included in the data frame is, for example, extracted by the management information processing section 114 and fed to the gateway management section 105.

In step S315, the gateway management section 105 acquires the address of the source of the data frame.

In step S316, the gateway management section 105 determines whether or not the address of the source is registered as Target Address.

In the case of determining in step S316 that the address of the source is registered as Target Address, then in step S317, the gateway management section 105 returns an ACK frame as necessary.

In step S318, the interface section 101 outputs to the equipment control section 23 the User Data extracted from the data frame and stored in the reception buffer 116 and transfers the User Data to the Internet side. The User Data extracted from the data frame is output from the equipment control section 23 to the Internet connection module 21 which then transmits the User Data to an external apparatus on the Internet corresponding to a destination.

After the uplink data is transmitted as described above, the processing proceeds to step S319. In a case where the gateway management section 105 determines in step S314 that the data frame has not been received or determines in step S316 that the address of the source of the data frame is not registered as Target Address, the processing also proceeds to step S319.

In step S319, the gateway management section 105 determines whether or not data from the Internet side has been received.

Downlink data transmitted from an external apparatus on the Internet is received at the Internet connection module 21 which feeds the downlink data to the wireless communication module 25 via the equipment control section 23. The downlink data fed to the wireless communication module 25 is fed from the interface section 101 to the transmission buffer 102 where the downlink data is stored. Additionally, the address included in the downlink data and specifying the data destination is fed to the gateway management section 105 via the network management section 103.

In step S320, the gateway management section 105 acquires the address of the destination fed via the network management section 103.

In step S321, the gateway management section 105 determines whether or not the address of the destination is registered as Target Address.

In a case where the gateway management section 105 determines in step S321 that the address of the destination is registered as Target Address, then in step S322, the transmission frame construction section 104 generates a data frame including as User Data the data stored in the transmission buffer 102 and causes the wireless transmission processing section 109 to transmit the data frame on the basis of the predetermined access control protocol.

After the downlink data is transmitted as described above, the processing proceeds to step S323. In a case where the gateway management section 105 determines in step S319 that no data from the Internet side has been received or determines in step S321 that the address of the destination is not registered as Target Address, the processing also proceeds to step S323.

In step S323, the gateway management section 105 determines whether or not the Gateway Disconnection Request frame corresponding to a request for cancellation of Internet connection has been received.

In the case of being received by the wireless reception processing section 111, the Gateway Disconnection Request frame is fed to the management information processing section 114 and analyzed. Parameters corresponding to analysis results for the Gateway Disconnection Request frame are fed from the management information processing section 114 to the gateway management section 105. The Gateway Disconnection Request frame includes the address of the source Station or the like as described above.

In the case of determining in step S323 that the Gateway Disconnection Request frame has been received, then in step S324, the gateway management section 105 transmits the Gateway Disconnection Grant frame.

Here, the Gateway Disconnection Grant frame is generated by the management information generation section 106. The Gateway Disconnection Grant frame generated by the management information generation section 106 is output to the wireless transmission processing section 109 which then transmits the Gateway Disconnection Grant frame to the Station having transmitted the Gateway Disconnection Request frame.

In step S325, the gateway management section 105 deletes from Target Address the address of the Station having transmitted the Gateway Disconnection Request frame, cancelling the registration.

In step S326, the network management section 103 updates the information related to the connection capacity and manages Internet Gateway Parameter including the updated information.

After Internet Gateway Parameter is updated or in a case where the gateway management section 105 determines in step S323 that the Gateway Disconnection Request frame has not been received, the processing ends.

In the communication apparatus 11 operating as an IG, the above-described series of steps of processing is repeatedly executed while Internet connection remains established. The Gateway Announcement frame is repeatedly transmitted to repeatedly notify surrounding Stations that the IG is present.

Operations of Station

Figure 22:
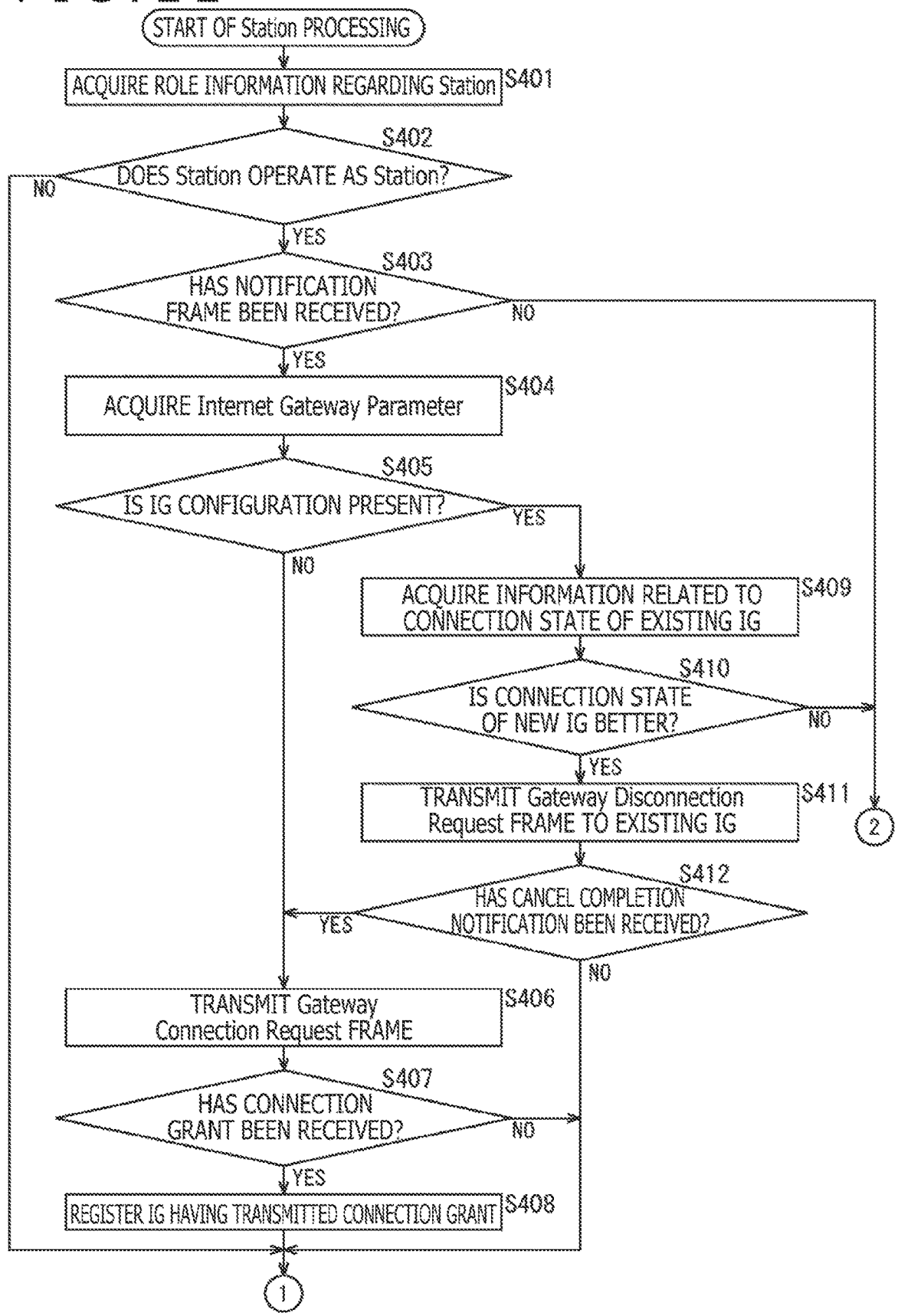
FIG. 22 is a flowchart illustrating processing executed by a Station.

Now, processing of the Station will be described with reference to flowcharts in FIG. 22 and FIG. 23. Descriptions overlapping the above descriptions are omitted as appropriate.

In step S401, the equipment control section 23 of the Station acquires role information regarding the Station.

In step S402, the equipment control section 23 determines whether or not the communication apparatus 11 operates as a Station.

In a case where the equipment control section 23 determines in step S402 that the communication apparatus 11 operates as a Station, then in step S403, the gateway management section 105 whether or not the Gateway Announcement frame has been received.

In the case of being received by the wireless reception processing section 111, the Gateway Announcement frame is fed to the management information processing section 114 which then analyzes the Gateway Announcement frame. Parameters corresponding to analysis results for the Gateway Announcement frame are fed from the management information processing section 114 to the gateway management section 105. The Gateway Announcement frame includes the address of the source IG or the like as described above.

In the case of determining in step S403 that the Gateway Announcement frame has been received, then in step S404, the gateway management section 105 acquires Internet Gateway Parameter included in the Gateway Announcement frame fed from the management information processing section 114.

In step S405, the gateway management section 105 determines whether or not any of the IGs is configured for use for Internet connection. In a case where a predetermined IG is used for Internet connection, the gateway management section 105 determines that any of the IGs is configured for Internet connection. Additionally, in a case where no Internet connection has been made, none of the IGs is configured for Internet connection.

In the case of determining in step S405 that none of the IGs is configured for Internet connection, then in step S406, the gateway management section 105 transmits the Gateway Connection Request frame.

Here, the management information generation section 106 generates the Gateway Connection Request frame including the parameters acquired by the gateway management section 105. The Gateway Connection Request frame generated by the management information generation section 106 is output to the wireless transmission processing section 109 which then transmits the Gateway Connection Request frame to the IG having transmitted the Gateway Announcement frame.

In step S407, the gateway management section 105 determines whether or not the Gateway Connection Grant frame, corresponding to a notification for grant of Internet connection, has been received by a predetermined waiting time.

As described above, the IG determines whether or not to grant Internet connection to the Station having transmitted the Gateway Connection Request frame, and in a case where the Internet connection is granted, the Gateway Connection Grant frame is returned.

In the case of determining in step S407 that the Gateway Connection Grant frame has been received, then in step S408, the gateway management section 105 registers as an IG used for Internet connection the IG having transmitted the Gateway Connection Grant frame. For example, the address of the IG included in the Gateway Connection Grant frame is registered as the destination of uplink data and as the source of downlink data.

On the other hand, in the case of determining in step S405 that any of the IGs has already been configured for Internet connection, then in step S409, the gateway management section 105 acquires information related to the connection state of the existing IG. For example, information related to the intensity of radio waves from the IG used for Internet connection is acquired as information related to the connection state of the existing IG.

In step S410, the gateway management section 105 determines whether or not a new IG is in a better connection state. For example, the intensity of radio waves from the new IG is compared with the intensity of radio waves from the existing IG, and the IG with the higher intensity of radio waves is determined to be the IG in the better connection state.

In the case of determining the new IG to be in the better connection state in step S410, then in step S411, the gateway management section 105 transmits the Gateway Disconnection Request frame to the existing IG.

Here, the management information generation section 106 generates the Gateway Disconnection Request frame including the parameters acquired by the gateway management section 105. The Gateway Disconnection Request frame generated by the management information generation section 106 is output to the wireless transmission processing section 109 which then transmits the Gateway Disconnection Request frame to the existing IG. The existing IG returns the Gateway Disconnection Grant frame.

In step S412, the gateway management section 105 determines whether or not the Gateway Disconnection Grant frame, corresponding to a notification of completion of Internet connection cancellation, has been received.

In a case where the gateway management section 105 determines in step S412 that the Gateway Disconnection Grant frame has been received, the processing proceeds to step S406, and the subsequent processing is executed.

Specifically, in a case where the Gateway Connection Request frame is transmitted to the new IG and the Gateway Connection Grant frame is returned, the IG registration is changed. Thus, instead of the existing IG, the new IG is used to make Internet connection.

In a case where the IG is registered in step S408 or a case where the equipment control section 23 determines in step S402 that the communication apparatus 11 does not operate as a Station, the processing ends. In a case where the gateway management section 105 determines in step S407 that the Gateway Connection Grant frame has not been received or determines in step S412 that the Gateway Disconnection Grant frame has not been received, the processing also ends.

Figure 23:
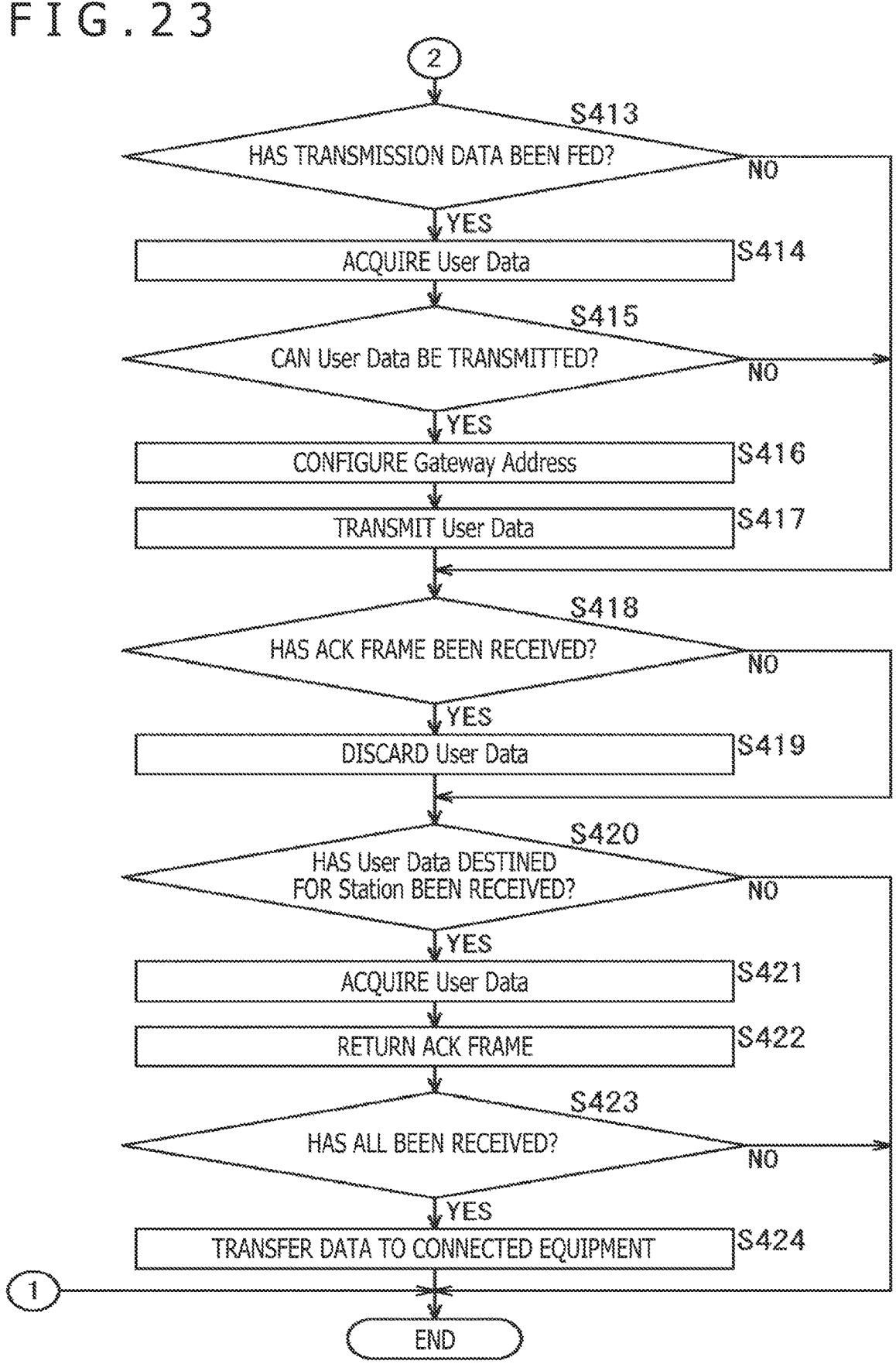
FIG. 23 is a flowchart continued from FIG. 22 and illustrating the processing executed by the Station.

On the other hand, in a case where the gateway management section 105 determines in step S403 that the Gateway Announcement frame has not been received or determines in step S410 that the new IG is in the worse connection state, the processing proceeds to step S413 (FIG. 23).

In step S413, the interface section 101 determines whether or not transmission data has been fed. For example, in a case where data generated by an application executed by the equipment control section 23 is transmitted to an external apparatus as uplink data, User Data used as transmission data is fed from the equipment control section 23.

In a case where the interface section 101 determines in step S413 that the transmission data has been fed, then in step S414, the interface section 101 acquires the User Data.

In step S415, the gateway management section 105 determines whether or not the User Data can be transmitted. Here, in a case where the IG registration has already been performed in step S408, the gateway management section 105 determines that the User Data can be transmitted.

In a case where the gateway management section 105 determines in step S415 that the User Data can be transmitted, then in step S416, the transmission frame construction section 104 reads the User Data from the transmission buffer 102 and configures the address of the IG to generate a data frame. Information regarding the address of the IG used as the destination of the data frame is fed from the gateway management section 105 to the transmission frame construction section 104 via the network management section 103.

In step S417, the wireless transmission processing section 109 transmits the data frame to the IG. Transmission of the data frame to the IG is timed to coincide with transmission of a data frame by another Station as appropriate as described with reference to FIG. 11.

After the transmission of the uplink data is performed as described above, the processing proceeds to step S418. In a case where the interface section 101 determines in step S413 that the transmission data has not been fed or a case where the gateway management section 105 determines in step S415 that the User Data fails to be transmitted, the processing also proceeds to step S418.

In step S418, the gateway management section 105 determines whether or not the ACK frame has been received via the management information processing section 114.

In a case where the gateway management section 105 determines in step S418 that the ACK frame has been received, then in step S419, the transmission frame construction section 104 discards the User Data stored in the transmission buffer 102. In a case where the gateway management section 105 determines in step S418 that no ACK frame has been received, the processing in step S419 is skipped.

In step S420, the gateway management section 105 determines whether or not the User Data destined for the Station itself has been received. For example, downlink data transmitted from an external apparatus and received at the IG is transmitted from the IG using a data frame.

In a case where the gateway management section 105 determines in step S420 that the data destined for the Station itself has been received, then in step S421, the reception data construction section 115 extracts the User Data from the data frame and stores the User Data in the reception buffer 116.

In step S422, the gateway management section 105 returns the ACK frame to the IG. Reception of the data frame from the IG is performed as appropriate, and as an example, is timed to coincide with reception of a data frame by another Station as described with reference to FIG. 11.

In step S423, the gateway management section 105 determines whether or not all of the series of downlink data has been received or a predetermined output timing has elapsed.

In a case where the gateway management section 105 determines in step S423 that all of the data has been received or the predetermined output timing has elapsed, then in step S424, the interface section 101 reads the downlink data from the reception buffer 116 and transfers the downlink data to connected equipment such as the information output module 24.

After the downlink data has been transferred, the processing ends. In a case where the gateway management section 105 determines in step S420 that no data destined for the Station itself has been received or determines in step S423 that not all of the series of downlink data has been received, the processing also ends.

As described above, provision of a plurality of communication apparatuses managing Internet connection allows the load of the Internet connection to be distributed.

Additionally, because each Station selects the closest IG for Internet connection, the required transmission power for radio waves can be minimized, and data transmission can be achieved at a higher communication rate.

The predetermined IG-Station communication and the another IG-Station communication can be simultaneously performed in the same space, enabling the utilization efficiency of transmission paths to be improved using spatial multiplexing of multiuser MIMO (Multi-Input Multi-Output) or the like.

<Examples of Parameters>

In the above description, the Station selects the IG on the basis of the intensity of radio waves. However, the selection may be based on the various parameters included in the Gateway Announcement frame. In this case, the IG that is located close and that is in a good connection state is not always selected, but the IG used for Internet connection is selected on the basis of various criteria.

The Gateway Announcement frame transmitted from the IG includes Gateway Parameter, Gateway Attribute, and Gateway Control as described with reference to FIG. 13. The IG is selected using these parameters.

FIG. 24 is a diagram illustrating examples of parameters included in Gateway Parameter.

Gateway Parameter includes parameters varying with state and included in the parameters related to the Internet connection capability.

As illustrated in FIG. 24, Gateway Parameter includes Usage Channels, Resource Unit Bandwidth, Protocol Version, TTL Value, Hop Value, Average Speed, Connect Counts, Usage MCS, Usage TX Power, and Available Capacity.

Usage Channels represent channels (frequency bands) that are included in available channels in the wireless LAN network and that are in actual use.

Resource Unit Bandwidth represents a bandwidth of a resource unit.

Protocol Version represents a version of a protocol in use.

TTL Value represents a value of Time To Live in the wireless LAN network.

Hop Value represents the number of connection hops.

Average Speed represents an average speed of communication.

Connect Counts represent the number of connected devices in use.

Usage MCS represents available modulation schemes and coding rates.

Usage TX Power represents the transmission power in use.

Available Capacity represents an available connection capacity.

The communication apparatus 11 operating as an IG configures values for these parameters according to a communication status and transmits the parameters in the Gateway Announcement frame.

The communication apparatus 11 operating as a Station analyzes the Gateway Announcement frame and makes determinations such as selection of the IG having, for example, the highest communication speed represented by Average Speed included in Gateway Parameter.

These types of information may be described in the Gateway Announcement frame as parameters in bit map format indicating available portions. The bit map format is a format including information indicating that the bits of the currently supported parameter, included in the parameters with values varying with status, are effective.

FIG. 25 is a diagram illustrating examples of parameters included Gateway Attribute.

Gateway Attribute includes invariable parameters included in the parameters related to the capability of the IG for Internet connection.

As illustrated in FIG. 25, Gateway Attribute includes Frequency Bands, Channel Bandwidth, W-LAN Type, Country Code, Support Protocol, Connect Cost, Device Counts, Support MCS, MAX TX Power, and Max Capacity.

Frequency Bands represent frequency bands (2.4 GHz, 5 GHz, and the like) that are available for the IG.

Channel Bandwidth represents a channel width utilized by the IG. W-LAN Type represents wireless LAN communication standards (802.11a/b/g/n/ac/ad/ah/ax or the like) supported by the IG.

Country Code represents a country in which the IG is installed.

Support Protocol represents a generation of a protocol implemented in the IG.

Connection Cost represents a cost of Internet connection.

Device Counts represent a maximum number of Stations to which Internet connection is granted.

Support MCS represents MCS supported by the IG.

Max TX Power represents a maximum transmission power of the IG.

Max Capacity represents a maximum connection capacity of the IG.

The communication apparatus 11 operating as an IG configures fixed values for these parameters and transmits the parameters in the Gateway Announcement frame. Information including the parameter values may be acquired from a predetermined server via the Internet.

The communication apparatus 11 operating as a Station analyzes the Gateway Announcement frame and makes determinations such as selection of the IG involving, for example, the lowest cost represented by Connection Cost included in Gateway Attribute.

FIG. 26 is a diagram illustrating examples of parameters included in Gateway Control.

Gateway Control includes parameters configured by the user and parameters configured in accordance with instructions from a predetermined apparatus on the network.

As illustrated in FIG. 26, Gateway Control includes Gateway IP Address, Local Address, User Select Information, Priority Gateway, Connection Domain, Connection Policy, Vendor Info, and Support Parameter.

Gateway IP Address represents an IP address of the IG configured for connection to the Internet.

Local Address represents a local address of the IG.

User Select Information represents that the IG is specified by the user to be used for Internet connection.

Priority Gateway represents a priority of the IG used for Internet connection.

Connection Domain represents a domain of the connection destination.

Connection Policy represents a connection policy configured by the user.

Vender Info represents information regarding a vender of the IG.

Support Parameter is information configured by the user to be supported.

The communication apparatus 11 operating as an IG configures values for these parameters according to a configuration status of the user or the like and transmits the parameters in the Gateway Announcement frame.

The communication apparatus 11 operating as a Station analyzes the Gateway Announcement frame and makes determinations such as selection of the IG having, for example, the highest priority represented by Priority Gateway included in Gateway Control.

The selection of the IG by the Station may be based on a combination of a plurality of the parameters as described above and included in Gateway Parameter, Gateway Attribute, or Gateway Control, instead of one of the parameters.

<Example of Communication Relayed through AC>

In the above description, the communication apparatus 11 operating as a Station selects one of the plurality of IGs that can communicate directly with the communication apparatus 11. However, the IG that fails to communicate directly with the communication apparatus 11 may be used for Internet connection.

In this case, each Station can select not only the IG located at such a place that the Station operates as a Near Station but also the IG located at such a place that the Station operates as a Far Station, as the IG used for Internet connection. As described above, Near Station/Far Station is an attribute determined on the basis of the positional relation between the IG and the Station.

Communication between a certain IG and a Station operating as a Far Station when the position of the IG is assumed as a reference is relayed by the AC.

Figure 27:
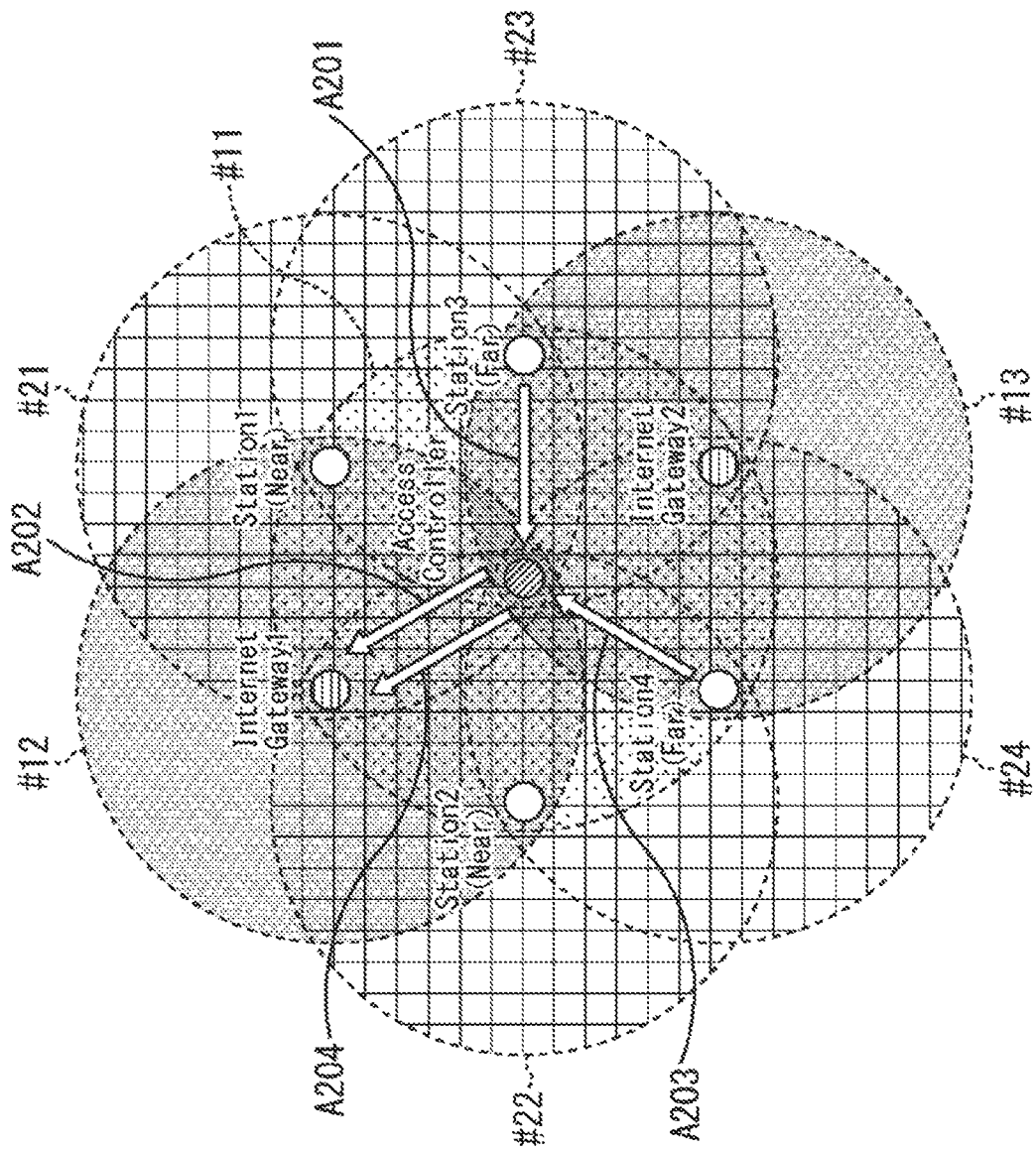
FIG. 27 is a diagram illustrating an example of a flow of uplink data.

FIG. 27 is a diagram illustrating an example of a flow of uplink data transmitted by a Far Station.

A configuration of a network illustrated in FIG. 27 is the same as the configuration described with reference to FIG. 1. With the Internet Gateway 1 used as a reference, the Station 1 and the Station 2, which can communicate directly with the Internet Gateway 1, operate as Near Stations. The Station 3 and the Station 4, which fail to communicate directly with the Internet Gateway 1 but are present within the reachable range of radio waves from the AC, operate as Far Stations. The Station 3 and the Station 4 operating as Far Stations are assumed to select the Internet Gateway 1 as an IG used for Internet connection.

In this case, as indicated by blank arrows A201 and A202, uplink data transmitted to an external apparatus by the Station 3 is relayed by the AC and received by the Internet Gateway 1 which transmits the uplink data to the destination external apparatus.

Additionally, as indicated by blank arrows A203 and A204, uplink data transmitted to an external apparatus by the Station 4 is relayed by the AC and received by the Internet Gateway 1 which transmits the uplink data to the destination external apparatus.

Figure 28:
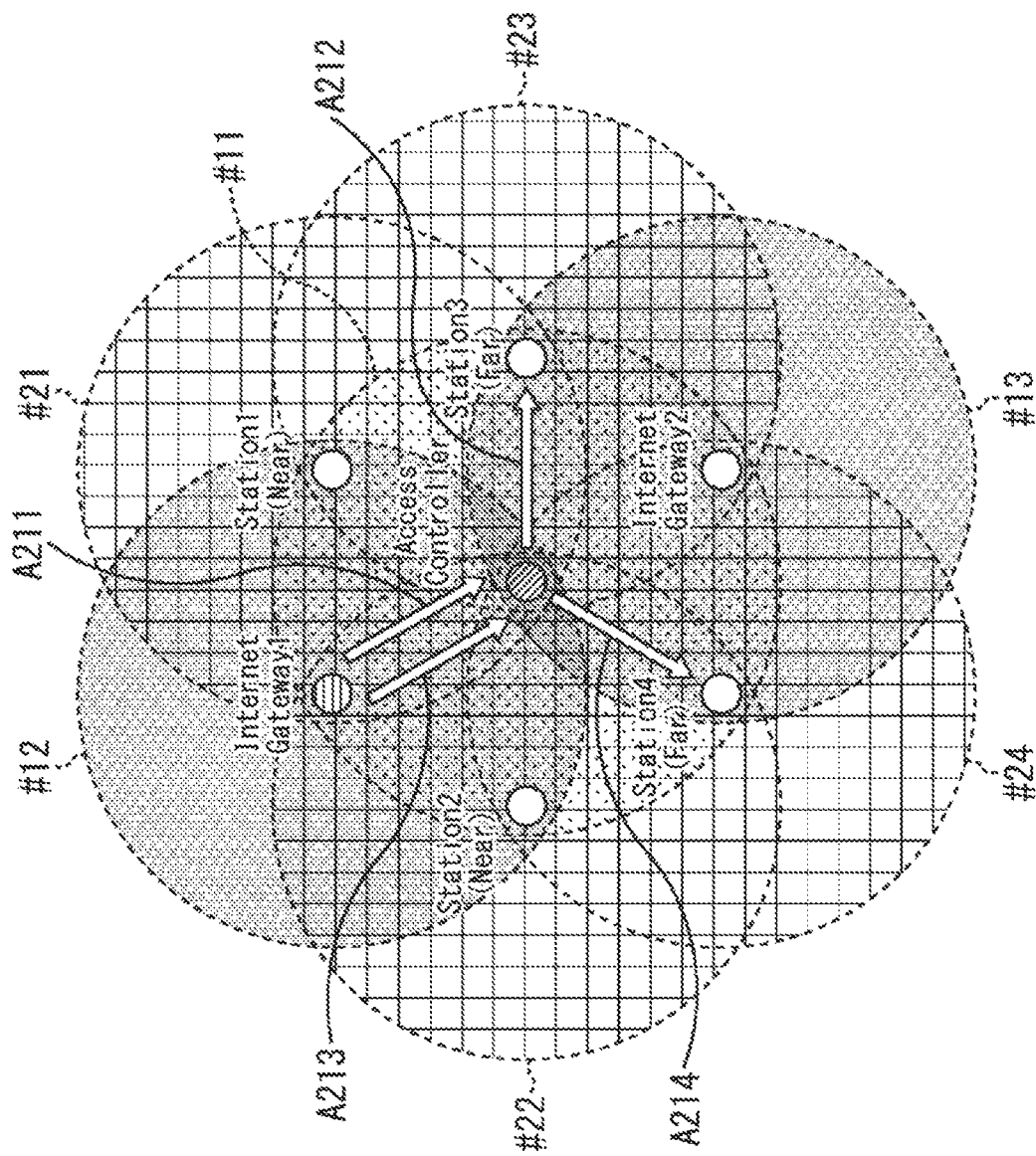
FIG. 28 is a diagram illustrating an example of a flow of downlink data.

FIG. 28 is a diagram illustrating an example of a flow of downlink data to the Far Station.

As illustrated by blank arrows A211 and A212, downlink data for the Station 3 transmitted from an external apparatus and received at the Internet Gateway 1 is transmitted from the Internet Gateway 1 to the Station 3 via the AC.

As illustrated by blank arrows A213 and A214, downlink data for the Station 4 transmitted from an external apparatus and received at the Internet Gateway 1 is transmitted from the Internet Gateway 1 to the Station 4 via the AC.

As described above, in the case of selecting the Internet Gateway 1 as an IG used for Internet connection, the Station 3 and the Station 4, operating as Far Stations can communicate with the Internet Gateway 1 via the AC. Accordingly, the AC includes a function for relaying the communication between the IG and the Station.

With reference to a sequence in FIG. 29, a series of steps of processing for selecting the IG used for Internet connection will be described.

The sequence illustrated in FIG. 29 indicates processing in which, for example, the Station 3 which operates as a Far Station when the Internet Gateway 1 is used as a reference makes Internet connection using the Internet Gateway 1 and subsequently switches the connection destination to the Internet Gateway 2 located closest. For example, the Internet Gateway 2 is an IG configured after the Internet Gateway 1.

Figure 29:
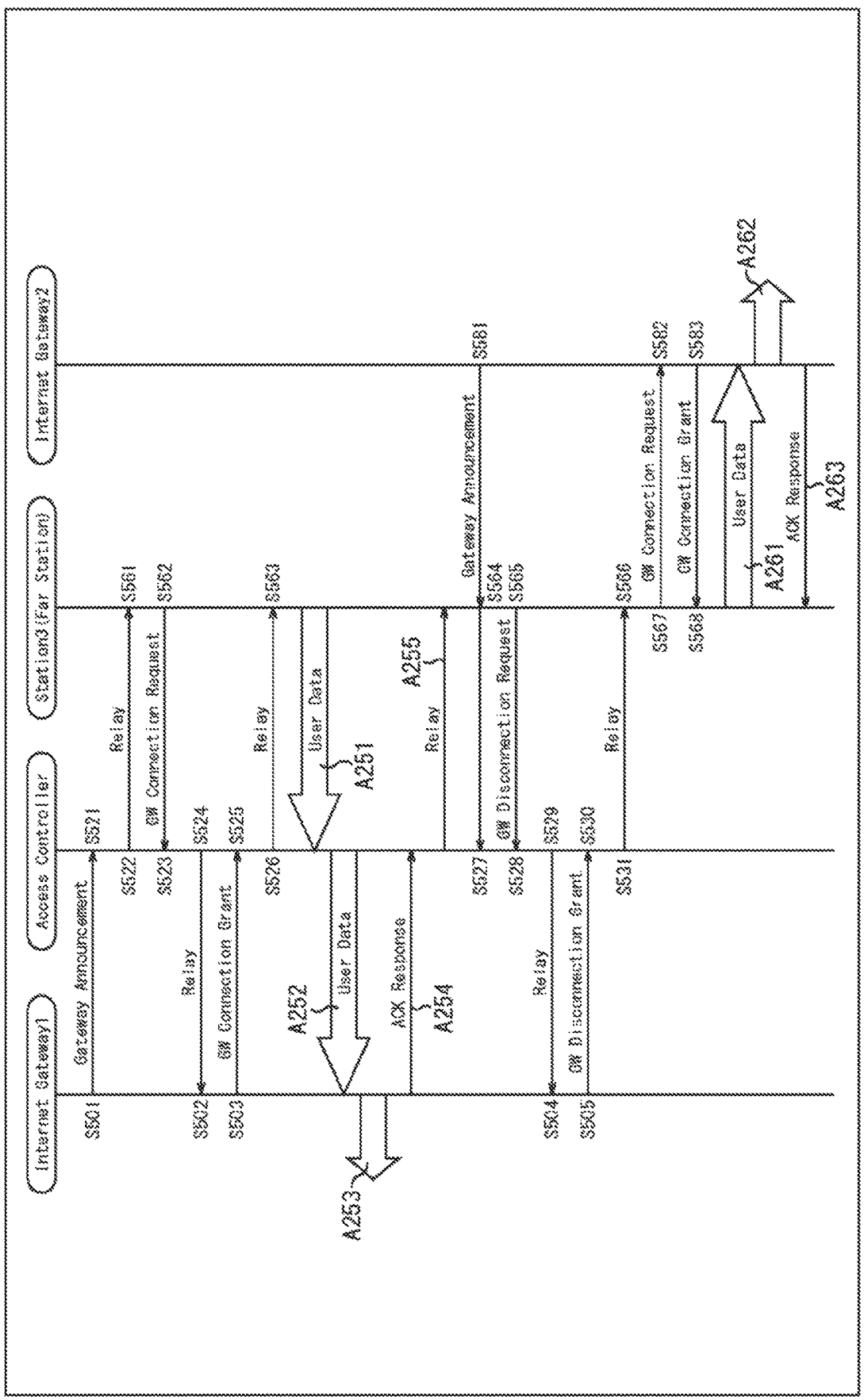
FIG. 29 is a sequence diagram illustrating a series of steps of processing for selecting an IG used for Internet connection.

The example in FIG. 29 illustrates processing of the Internet Gateway 1, processing of the AC, processing of the Station 3 operating as a Far Station, and processing of the Internet Gateway 2 in this order from the left.

In step S501, the Internet Gateway 1 transmits the Gateway Announcement frame indicating that the Internet Gateway 1 operates as an IG.

The Gateway Announcement frame may include the Action frame or include the Management frame. In a case where the Internet Gateway 1 also functions as the AC, the information in the Gateway Announcement frame may be included in the Beacon frame for transmission.

The Gateway Announcement frame transmitted from the Internet Gateway 1 is received by the AC in step S521 and transmitted to the Station 3 in step S522 as Relay data. Note that in a case where any Far Station is present as viewed from the Internet Gateway 1, the Gateway Announcement frame may be relayed by the AC.

As described above, the Gateway Announcement frame transmitted by the Internet Gateway 1 is relayed by the AC and delivered throughout the network around the AC. The Gateway Announcement frame is directly delivered to the Near Station without being relayed by the AC.

In step S561, the Station 3 receives the Gateway Announcement frame relayed by the AC.

In step S562, the Station 3 transmits the Gateway Connection Request frame requesting Internet connection using the Internet Gateway 1 as a destination.

The Gateway Connection Request frame transmitted from Station 3 is received by the AC in step S523 and transmitted to the Internet Gateway 1 in step S524 as Relay data.

In step S502, the Internet Gateway 1 receives the Gateway Connection Request frame relayed by the AC.

In a case where the request from the Station 3 is accepted, then in step S503, the Internet Gateway 1 returns the Gateway Connection Grant frame using the Station 3 as a destination. The Gateway Connection Grant frame transmitted by the Internet Gateway 1 represents that Internet connection is granted.

The Gateway Connection Grant frame transmitted from the Internet Gateway 1 is received by the AC in step S525 and transmitted to the Station 3 in step S526 as Relay data.

In step S563, the Station 3 receives the Gateway Connection Grant frame relayed by the AC. Accordingly, the Station 3 connects to the Internet via the Internet Gateway 1 and is enabled to communicate with an external apparatus. Communication between the Station 3 and the Internet Gateway 1 is relayed by the AC.

For example, uplink User Data is transmitted from the Station 3 to the Internet Gateway 1 via the AC as indicated by blank arrows A251 and A252 and transmitted via the Internet Gateway 1 to the external apparatus as indicated by blank arrow A253. The ACK representing receipt acknowledgement is returned from the Internet Gateway 1 having received the User Data to the Station 3 via the AC as indicated by arrows A254 and A255.

Here, in step S581, the Internet Gateway 2 transmits the Gateway Announcement frame indicating that the Internet Gateway 2 operates as an IG.

The Gateway Announcement frame transmitted from the Internet Gateway 2 is received by the Station 3 in step S264 and received by the AC in step S527.

The Station 3 having received the Gateway Announcement frame selects Internet connection using the Internet Gateway 2. The determination in this case is based, for example, on the parameters included in the Gateway Announcement frame or on a radio wave reception status.

In step S565, the Station 3 transmits the Gateway Disconnection Request frame requesting cancellation of Internet connection using, as a destination, the Internet Gateway 1 corresponding to the existing IG.

The Gateway Disconnection Request frame transmitted from the Station 3 is received by the AC in step S528 and transmitted to the Internet Gateway 1 in step S529 as Relay data.

In step S504, the Internet Gateway 1 receives the Gateway Disconnection Request frame relayed by the AC.

In a case where the request from the Station 3 is accepted, then in step S505, the Internet Gateway 1 returns the Gateway Disconnection Grant frame using the Station 3 as a destination.

The Gateway Disconnection Grant frame transmitted from the Internet Gateway 1 is received by the AC in step S530 and transmitted to the Station 3 in step S531 as Relay data.

In step S566, the Station 3 receives the Gateway Disconnection Grant frame relayed by the AC.

In step S567, the Station 3 transmits to the Internet Gateway 2 the Gateway Connection Request frame requesting Internet connection. Transmission of the Gateway Connection Request frame to the Internet Gateway 2 is directly performed without being relayed by the AC.

In step S582, the Internet Gateway 2 receives the Gateway Connection Request frame transmitted from the Station 3. In a case where the request from the Station 3 is accepted, then in step S583, the Internet Gateway 2 returns the Gateway Connection Grant frame.

In step S568, the Station 3 receives the Gateway Connection Grant frame transmitted from the Internet Gateway 2. Accordingly, the Station 3 connects to the Internet via the Internet Gateway 2 and is enabled to communicate with an external apparatus.

Uplink User Data is directly transmitted from the Station 3 to the Internet Gateway 2 as indicated by blank arrow A261 and transmitted via the Internet Gateway 2 to the external apparatus as indicated by blank arrow A262. The ACK representing receipt acknowledgement is directly returned from the Internet Gateway 2 having received the User Data to the Station 3 as indicated by arrow A263.

As described above, the IG located where the IG is precluded from direct communication may be enabled to be selected as an IG used for Internet connection.

Modified Examples

A single station may be enabled to switch the IG used for Internet connection depending on the type of data. For example, a predetermined IG may be enabled to be selected as an IG used for transmission of uplink data, and another IG may be enabled to be selected as an IG used for reception of downlink data.

In the above-described case, the functions of the AC, the functions of the IG, and the functions of the IC are distributed. The functions of the AP may be further subdivided and the functions resulting from the subdivision may be distributed among more communication apparatuses 11.

In the network as described above in which the functions of the AP are shared among the plurality of communication apparatuses 11, data transmission based on OFDMA may be used instead of the data transmission based on multiuser MIMO.

Configuration Example of Computer

The above-described series of steps of processing can be executed by hardware or by software. In a case where the series of steps of processing is executed by software, a program included in the software is installed from a program recording medium into a computer integrated in dedicated hardware, a general-purpose personal computer, or the like.

FIG. 30 is a block diagram illustrating a configuration example of hardware of a computer executing the above-described series of steps of processing using the program.

A CPU (Central Processing Unit) 1001, a ROM (Read Only Memory) 1002, and a RAM (Random Access Memory) 1003 are connected together by a bus 1004.

An input/output interface 1005 is further connected to the bus 1004. The input/output interface 1005 connects to an input section 1006 including a keyboard, a mouse, and the like, and an output section 1007 including a display, a speaker, and the like. Additionally, the input/output interface 1005 connects to a storage section 1008 including a hard disk, a nonvolatile memory, and the like, a communication section 1009 including a network interface, and a drive 1010 driving a removable medium 1011.

In the computer configured as described above, the CPU 1001 performs the above-described series of steps of processing by loading a program stored in the storage section 1008 into the RAM 1003 via the input/output interface 1005 and the bus 1004 and executing the program.

The program executed by the CPU 1001 is provided in the removable medium 1011 in which the program is recorded or is provided via a wired or wireless transmission medium such as a local area network, the Internet, or digital broadcasting and is then installed in the storage section 1008.

Note that the program executed by the computer may be a program chronologically executing processing along the order described herein or a program executing processing in parallel or at required timings when invocation is performed or the like.

The system as used herein means a set of a plurality of components (apparatuses, modules (parts), and the like) regardless of whether or not all of the components lie inside the same housing. Accordingly, the system refers to both a plurality of apparatuses contained in separate housings and connected together via a network and one apparatus including a plurality of modules contained in one housing.

Note that effects described herein are only illustrative and are not restrictive, and that other effects may be produced.

The embodiments of the present technique are not limited to the above-described embodiment, but various changes can be made to the embodiment without departing from the spirits of the present technique.

For example, the present technique can be configured as cloud computing in which one function is shared among a plurality of apparatuses via the network.

Additionally, the steps described in the above-described flowcharts can be executed by one apparatus or shared among a plurality of apparatuses.

Furthermore, in a case where one step includes a plurality of types of processing, not only can the plurality of types of processing included in the one step be executed by one apparatus but also be shared among a plurality of apparatuses for execution.

Example of Combination of Components

The present technique can also be configured as follows.

(1)

A communication apparatus included in a wireless LAN including a plurality of communication apparatuses functioning as gateways, the communication apparatus including:

a communication control section configured to transmit, when the subject communication apparatus is connected to an external network, a management frame including a parameter related to a capability of connecting to the external network, to another apparatus within the wireless LAN.

(2)

The communication apparatus according to (1) described above, in which the communication control section controls connection to the external network made by the another apparatus.

(3)

The communication apparatus according to (2) described above, in which the communication control section receives connection request information transmitted from the another apparatus and representing a request for connection to the external network and, in a case where the connection to the external network is granted, transmits to the another apparatus grant information representing that the connection to the external network is granted.

(4)

The communication apparatus according to (3) described above, in which the communication control section determines, on the basis of a connection capacity, whether or not connection to the external network is granted to the another apparatus having transmitted the connection request information.

(5)

The communication apparatus according to (3) or (4) described above, in which, in a case where cancellation request information representing a request for cancellation of the connection to the external network is transmitted from the another apparatus, the communication control section terminates the connection to the external network.

(6)

The communication apparatus according to (5) described above, in which the cancellation request information includes an address of the subject communication apparatus newly used for the connection to the external network by the another apparatus.

(7)
The communication apparatus according to any one of (1) to (6) described above, in which the communication control section controls transmission power for radio waves within a range in which communication with the another apparatus within a network is enabled.

(8)
The communication apparatus according to (7) described above, in which the another apparatus within the network includes a control apparatus responsible for a function for access control in the wireless LAN.

(9)
The communication apparatus according to (2) described above, in which the communication control section performs transmission of data to the another apparatus at a timing overlapping a timing for transmission of data by the communication apparatus responsible for the function of the gateway.

(10)
The communication apparatus according to (2) described above, in which the communication control section performs reception of data transmitted from the another apparatus at a timing overlapping a timing for reception of data by the communication apparatus responsible for the function of the gateway.

(11)
A communication apparatus including:
a communication control section configured to receive a management frame transmitted from a predetermined apparatus connected to an external network and included in a plurality of predetermined apparatuses functioning as gateways for a wireless LAN, the management frame including a parameter related to a capability of connecting to the external network, the communication control section transmitting, to any one of the predetermined apparatuses, connection request information representing a request for connection to the external network.

(12)
The communication apparatus according to (11) described above, in which the communication control section receives grant information transmitted from the predetermined apparatus to which the connection request information is transmitted, the grant information representing that connection to the external network is granted, and the communication apparatus further includes:
a management section configured to register the predetermined apparatus having transmitted the grant information, as a gateway used for the connection to the external network.

(13)
The communication apparatus according to (12) described above, in which the management section selects, on the basis of a connection capability of each predetermined apparatus represented by the parameter, the predetermined apparatus requesting connection to the external network, and
the communication control section transmits the connection request information to the predetermined apparatus selected.

(14)
The communication apparatus according to (13) described above, in which, in a case where the predetermined apparatus requesting connection to the external network is newly selected, the communication control section transmits, to the predetermined apparatus, cancellation request information representing a request for cancellation of the connection to the external network.

(15)
The communication apparatus according to any one of (11) to (14) described above, in which the communication control section controls transmission power for radio waves within a range in which communication with another apparatus within a network is enabled.

(16)
The communication apparatus according to (15) described above, in which the another apparatus within the network includes a control apparatus responsible for a function for access control in the wireless LAN.

(17)
The communication apparatus according to (12) described above, in which the communication control section performs transmission of data to the predetermined apparatus at a timing overlapping a timing for transmission, by the another apparatus within the wireless LAN, of data to another of the predetermined apparatuses responsible for the function of the gateway.

(18)
The communication apparatus according to (12) described above, in which the communication control section performs reception of data transmitted from the predetermined apparatus at a timing overlapping a timing for reception, by the another apparatus, of data transmitted by another of the predetermined apparatuses responsible for the function of the gateway.

(19)
A communication system including:
a first communication apparatus included in a wireless LAN including a plurality of communication apparatuses functioning as gateways, the first communication apparatus including
a communication control section configured to transmit, when the first communication apparatus is connected to an external network, a management frame including a parameter related to a capability of connecting to the external network, to another apparatus within the wireless LAN; and
a second communication apparatus operating as the first communication apparatus and including
a communication control section configured to receive the management frame transmitted from the first communication apparatus and transmit, to the first communication apparatus, connection request information representing a request for connection to the external network.

REFERENCE SIGNS LIST

11 Communication apparatus
21 Internet connection module
22 Information input module
23 Equipment control section
24 Information output module
25 Wireless communication module
51 Input/output section
52 Communication control section
53 Baseband processing section
101 Interface section
102 Transmission buffer
103 Network management section
104 Transmission frame construction section
105 Gateway management section
106 Management information generation section
107 Transmission timing control section
108 Transmission power control section
109 Wireless transmission processing section
110 Antenna control section 111 Wireless reception processing section
112 Detection threshold control section
113 Reception timing control section
114 Management information processing section
115 Reception data construction section
116 Reception buffer

The invention claimed is:

1. A first communication apparatus, comprising: a communication control section configured to: transmit, based on connection of the first communication apparatus to an external network, a management frame to a specific apparatus, wherein
the management frame includes a parameter indicating a connection capacity of the first communication apparatus, the connection capacity of the first communication apparatus indicates a first number of communication apparatuses to which the first communication apparatus can grant connection to the external network,
a wireless LAN includes a plurality of communication apparatuses,
the plurality of communication apparatuses includes the first communication apparatus, and
each of the plurality of communication apparatuses functions as a gateway;
determine a second number of communication apparatuses to which the first communication apparatus has granted connection to the external network is less than the first number of communication apparatuses; and
grant connection of the specific apparatus to the external network based on the determination that the second number of communication apparatuses is less than the first number of communication apparatuses;
wherein the communication control section is further configured to control transmission power for radio waves within a range in which communication with the specific apparatus is enabled; and
wherein the specific apparatus includes a control apparatus responsible for a function for access control in the wireless LAN.

2. The first communication apparatus according to claim 1, wherein the communication control section is further configured to:
receive connection request information from the specific apparatus, wherein the connection request information represents a request for the connection of the specific apparatus to the external network; and
transmit, in a case where the connection of the specific apparatus to the external network is granted, to the specific apparatus, grant information representing that the connection of the specific apparatus to the external network is granted.

3. The first communication apparatus according to claim 2, wherein the communication control section is further configured to:
receive cancellation request information representing a request for cancellation of the connection of the specific apparatus to the external network from the specific apparatus; and
terminate the connection of the specific apparatus to the external network based on the cancellation request information.

4. The first communication apparatus according to claim 3, wherein the cancellation request information includes an address of a second communication apparatus of the plurality of communication apparatuses to be used for the connection of the specific apparatus to the external network.

5. The first communication apparatus according to claim 1, wherein the communication control section is further configured to perform transmission of data to the specific apparatus at a first timing overlapping a second timing of transmission of data by a second communication apparatus of the plurality of communication apparatuses.

6. The first communication apparatus according to claim 1, wherein the communication control section is further configured to perform reception of data from the specific apparatus at a first timing overlapping a second timing of reception of data by a second communication apparatus of the plurality of communication apparatuses.

* * * * *